United States Patent
Kageyama

(10) Patent No.: US 7,761,490 B2
(45) Date of Patent: Jul. 20, 2010

(54) METHOD, APPARATUS AND PROGRAM RECORDED MEDIUM FOR INFORMATION PROCESSING

(75) Inventor: Yusuke Kageyama, Kanagawa (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 355 days.

(21) Appl. No.: 11/454,094

(22) Filed: Jun. 16, 2006

(65) Prior Publication Data
US 2006/0287973 A1    Dec. 21, 2006

(30) Foreign Application Priority Data
Jun. 17, 2005    (JP) ............................... 2005-177360

(51) Int. Cl.
*G06F 12/00* (2006.01)
*G06F 17/30* (2006.01)

(52) U.S. Cl. .................. 707/827; 707/829; 709/223

(58) Field of Classification Search .................. 707/100
See application file for complete search history.

(56) References Cited

U.S. PATENT DOCUMENTS

| | | | |
|---|---|---|---|
| 5,897,627 A * | 4/1999 | Leivian et al. ................. 706/12 |
| 6,473,080 B1 * | 10/2002 | Brown et al. ................. 345/419 |
| 6,766,283 B1 * | 7/2004 | Goldman et al. ............... 703/2 |
| 6,778,995 B1 * | 8/2004 | Gallivan ..................... 707/102 |
| 2002/0042793 A1 * | 4/2002 | Choi ............................. 707/6 |
| 2002/0184172 A1 * | 12/2002 | Shlain et al. .................. 706/20 |
| 2003/0212699 A1 * | 11/2003 | Denesuk et al. ............. 707/102 |
| 2005/0008227 A1 * | 1/2005 | Duan et al. ................. 382/195 |
| 2005/0066305 A1 * | 3/2005 | Lisanke ..................... 717/104 |
| 2005/0114382 A1 * | 5/2005 | Lakshminarayan et al. . 707/102 |

FOREIGN PATENT DOCUMENTS

JP    2003-316796 A    11/2003

OTHER PUBLICATIONS

W. K. Hastings, "Monte Carlo sampling methods using Markov chains and their applications", Biometrika, 1970.*

* cited by examiner

*Primary Examiner*—Cam Y T Truong
(74) *Attorney, Agent, or Firm*—Foley & Lardner LLP

(57) ABSTRACT

An apparatus processes information indicative of a relationship between several parameters to determine the meaning of a classification. The apparatus classifies a set of attributes which represent relationships between an input and an output of a system into classification levels. The apparatus also indicates a limiting element corresponding to the classified attribute, and compares the indicated limiting element in a classified level with the indicated limiting element in another classified level in order to obtain the technical meaning of a classification in a clustering technique simultaneously with the execution of the classification.

33 Claims, 20 Drawing Sheets

| | A | B | C | 4 | D | 6 | 7 |
|---|---|---|---|---|---|---|---|
| 1 | 1 | 1 | 1 | 1 | 1 | 1 | 1 |
| 2 | 1 | 1 | 1 | 2 | 2 | 2 | 2 |
| 3 | 1 | 2 | 2 | 1 | 1 | 2 | 2 |
| 4 | 1 | 2 | 2 | 2 | 2 | 1 | 1 |
| 5 | 2 | 1 | 2 | 1 | 2 | 1 | 2 |
| 6 | 2 | 1 | 2 | 2 | 1 | 2 | 1 |
| 7 | 2 | 2 | 1 | 1 | 2 | 2 | 1 |
| 8 | 2 | 2 | 1 | 2 | 1 | 1 | 2 |

L₈

⇨

| COMBINATION | DATA |
|---|---|
| $A_1 \ B_1 \ C_1 \ D_1$ | $X_1$ |
| $A_1 \ B_1 \ C_1 \ D_2$ | $X_2$ |
| $A_1 \ B_2 \ C_2 \ D_1$ | $X_3$ |
| $A_1 \ B_2 \ C_2 \ D_2$ | $X_4$ |
| $A_2 \ B_1 \ C_2 \ D_2$ | $X_5$ |
| $A_2 \ B_1 \ C_2 \ D_1$ | $X_6$ |
| $A_2 \ B_2 \ C_1 \ D_2$ | $X_7$ |
| $A_2 \ B_2 \ C_1 \ D_1$ | $X_8$ |

CAUSE-EFFECT NETWORK OF CLUSTER 2

CAUSE-EFFECT NETWORK OF COMMON CONCEPT

CAUSE-EFFECT NETWORK OF FACTER TERM

FIG.13

| Multi link Suspension System | | | | | |
|---|---|---|---|---|---|
| Point Number | Point Name | Axis | Minimum | Maximum | Unit |
| M1 | Trailing_Body | x, y, z | -50 | 50 | mm |
| M2 | Upper_Outer | x, y, z | -50 | 50 | mm |
| M3 | Upper_Inner | x, y, z | -50 | 50 | mm |
| M4 | Lower_Outer | x, y, z | -50 | 50 | mm |
| M5 | Lower_Inner | x, y, z | -50 | 50 | mm |

CLUSTER 1

CLUSTER 2

CLUSTER 1

CLUSTER 2

——— 0.95-1.00
- - - - - 0.90-0.95

**CAUSE-EFFECT
NETWORK OF CLUSTER 2**

CAUSE-EFFECT NETWORK

METHOD, APPARATUS AND PROGRAM RECORDED MEDIUM FOR INFORMATION PROCESSING

BACKGROUND OF THE INVENTION

The present invention relates to a technique for processing information indicative of a relationship between a plurality of parameters and a response of a system with respect to the parameters.

Japanese Published Patent Application No. 2003-316796 discloses a clustering technique by which objects are clustered and classified in view of similarity of information to hierarchically classify the relationships of the classified objects.

SUMMARY OF THE INVENTION

Although the disclosed technique can execute a classification of information, a criterion for the classification is not always based on the attributes of the objects, and the meaning of the classification has to be estimated from the classification result by man power. For example, even if relationships between a stroke and a camber angle (attribute) of a suspension are classified, a technical meaning of the classification is not clear from the classification result.

It is therefore an object of the present invention to provide an information processing technique which enables the ascertainment of technical means of a classification in a clustering technique simultaneously with the execution of the classification.

An aspect of the present invention resides in an information processing apparatus which comprises: a classifying section classifying a set of attributes, which represent relationships between an input and an output of a system defined by a plurality of limiting elements, into classification levels on the basis of a tendency of the attributes; a limiting element indicating section indicating a limiting element corresponding to the classified attribute; and a comprising section comparing the indicated limiting element in a classified level with the indicated limiting element in other classified level.

Another aspect of the present invention resides in an information-processing-program recorded medium which comprises: a classification commanding section outputting a command to classify a set of attributes, which represent relationships between an input and an output of a system defined by a plurality of limiting elements, into classification levels on the basis of a tendency of the attributes; a limiting element indication commanding section outputting a command to indicate a limiting element corresponding to the classified attribute; and a comparison commanding section outputting a command to compare the indicated limiting element in a classified level with the indicated limiting element in other classified level.

Another aspect of the present invention resides in a display unit for information processing which comprises: a classification displaying section displaying a classification result of a set of attributes, which represent relationships between an input and an output of a system defined by a plurality of limiting elements, into classification levels on the basis of a tendency of the attributes; a limiting element indication displaying section displaying an indication result of a limiting element corresponding to the classified attribute; and a comparison displaying section displaying a comparison result of the indicated limiting element in a classified level with the indicated limiting element in other classified level.

A further another aspect of the present invention resides in a method of processing information which comprises: an operation of classifying a set of attributes, which represent relationships between an input and an output of a system defined by a plurality of limiting elements, into classification levels on the basis of a tendency of the attributes; an operation of indicating a limiting element corresponding to the classified attribute; and an operation of comparing the indicated limiting element in a classified level with the indicated limiting element in other classified level.

The other objects and features of this invention will become understood from the following description with reference to the accompanying drawings.

BRIEF DESCRIPTION OF THE DRAWINGS

FIG. 13 is a table showing a sampling as to geometry of the suspension which was produced according to an orthogonal table.

DETAILED DESCRIPTION OF THE INVENTION

Hereinafter, there is discussed an information processing method, an information processing apparatus and an information-processing program recording medium according to embodiments of the present invention with reference to drawings.

Technical Concept of Embodiment

Firstly, there is defined a term "system". The system is a processing system or order, which exists between a specific input and a specific result (output) brought from the specific input. By defining an inherent system using a value, a specific phenomenon is realized. This corresponds to a system defined by a plurality of limiting elements. The inherent system is not adapted to the processing or order of every object, and functions limitedly in number, area or property. Therefore, in the case that there exists various objects that differ with each other in limitation even though the kind of phenomenon is same, there exists systems corresponding to the respective different objects. Further, there exists an upper system which uniquely treats the objects according to the kind of phenomenon.

A hierarchical system structure relating to such a specific phenomenon is applicable in almost all phenomena of economy, culture, design, organism and the like. Through intuition, it has been accepted as a classification method which executes a classification based on some commonality and which is the best method of easily grasping a system thereof.

For example, in case of a vehicle suspension, an abstract system includes a suspension, an individual system includes a multi-link and a torsion beam, a concrete system includes a specific multi-link and a specific torsion beam which are determined from a concrete geometry value and a bush rigidity of the individual system.

However, this classification does not intend to concretely understand a relationship between the same level systems or between an upper level system and a lower level system. In order to execute a new try or discovery, it is necessary to utilize a commonality defining the relationship between systems and the whole system upon accurately understanding the commonality according to proceeding of the understanding of the phenomenon shown by the lowest level system. Herein, the uppermost level system is referred to as an abstract system, the intermediate level system is referred to as a format system, and the lowermost level system is referred to as a concrete system.

Figure 1:
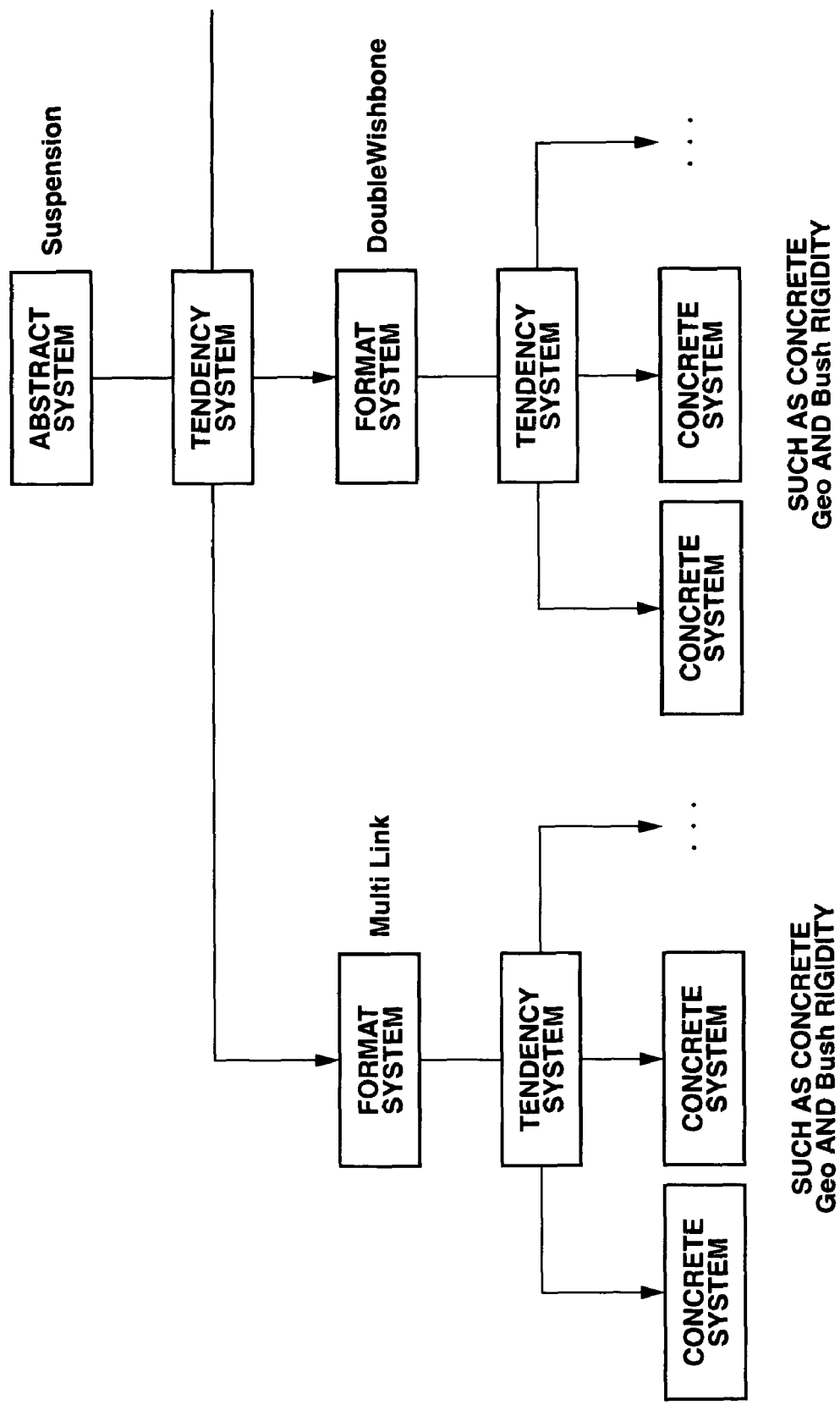
FIG. 1 is a block diagram showing a concept of systems according to an embodiment of the present invention.

In this embodiment, in order to enable the understanding of the whole system, tendency systems limited by tendency or area are provided between the abstract system and the format system and between the concrete system and the format system, respectively. This tendency system is a system classified by cluster and corresponds to classifying means. This arrangement enables the consideration as to the understanding of the whole system, the understanding of the characteristic between systems and the possibility of producing a new system. Such a relationship is shown in FIG. 1.

There has been discussed that the three level system structure is classified based on some commonality. Considering that a complicated phenomenon is achieved as a result of a combination of several phenomena, a characteristic of the complicated phenomenon is affected by a characteristic of a phenomenon or a combination of phenomena constituting the complicated phenomenon. Such a characteristic relates to the above-discussed commonality, and therefore the commonality is defined as a common concept of the system for achieving the complicated phenomenon.

It is considered that the format system, various phenomena caused by variously changing a parameter of the concrete system is ruled by a common concept specific in the format system and that the common concept realizes tendencies of the various phenomena. Specific tendencies of the phenomena caused in the concrete system are based on the common concept and are realized by specific patterns derived therefrom.

The common concept is one of a value of a special parameter, a combination of special parameters, a relationship between the special parameters, a tendency of the special parameter, an area of the value of the special parameter, and a combination of some of them, which most preferably explains the tendency of the various complicated phenomena. On the other hand, it is possible to define one of a value of a special parameter except for the common concept, a combination of the special parameter except for the common concept, a relationship between the special parameters except for the common concept, a tendency of the special parameter except for the common concept, an area (range) of the value of the special parameter except for the common concept, and a combination of some of them, as an inherent pattern. This inherent pattern corresponds to a factor term discussed later.

The common concept may exist between different systems which exist for the purpose of realizing a phenomenon. That is, since the various systems, which exist in the format system level, exist for the purpose of realizing the special phenomenon, the common concept exists in the upper level above the format system level, that is, in the abstract system, and the tendency of all phenomena are realized thereby. The tendency special for the phenomena is realized by adding a special pattern of the format system or the concrete system to the common concept.

Figure 2:
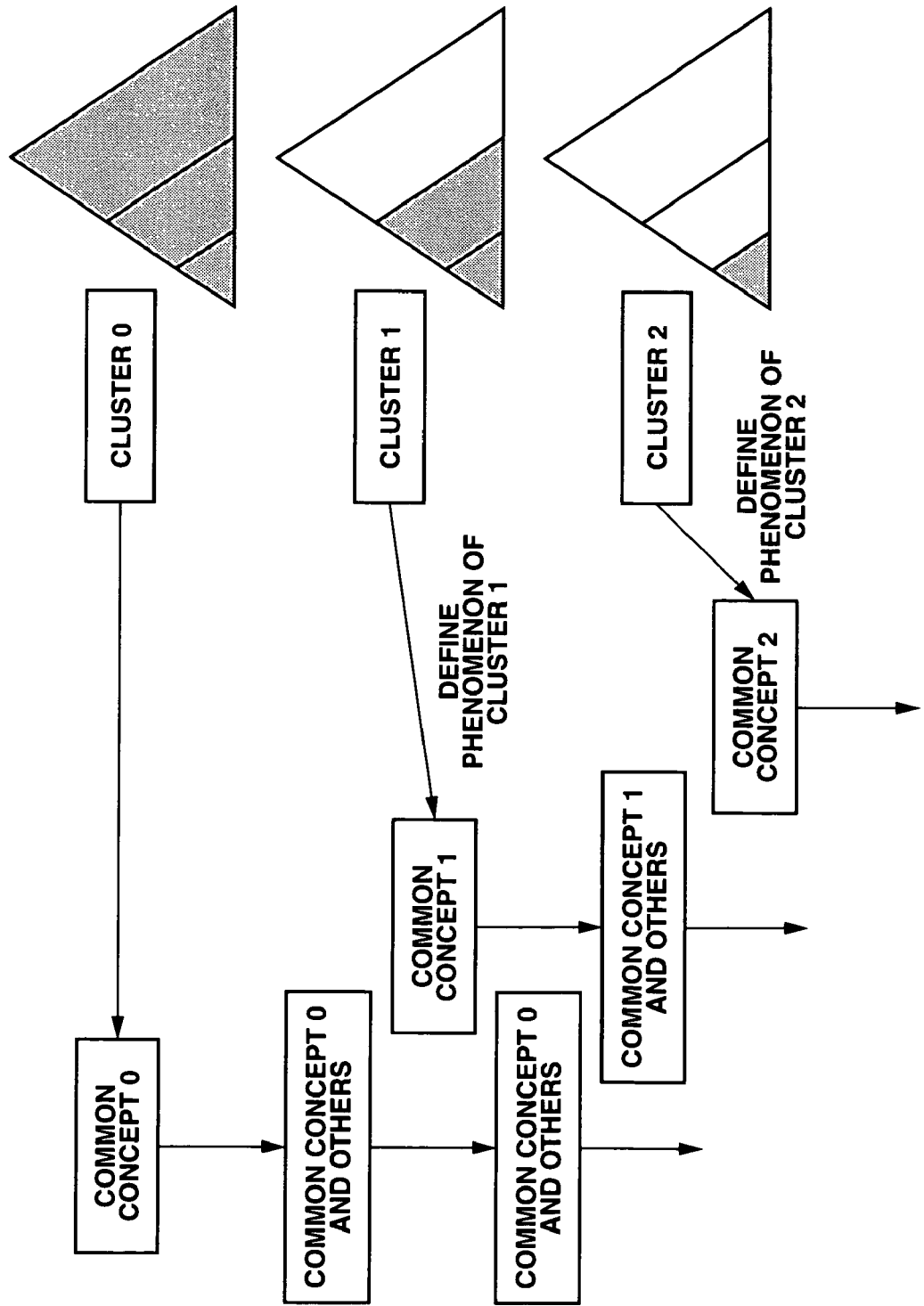
FIG. 2 is a schematic view showing a relationship between clusters and a common concept according to the embodiment of the present invention.

The first embodiment according to the present invention is constructed on the basis of the above discussed concept to understand the complicated phenomenon. FIG. 2 shows the concept of the first embodiment. In FIG. 2, common concept 0 is a concept of defining all phenomena, common concept 1 is a concept of defining phenomena in a hatching part of cluster 1, and common concept 2 is a concept of defining phenomena in a hatching part of cluster 2. The common concept 0 includes the common concept 1 and the common concept 2. By overlapping other common concepts with each common concept, the area is further limited.

The abstract system and the format system may be properly set while taking account of only the upper-limit relationship between all hierarchy levels. Therefore, the abstract system is not limited to the uppermost level. The order of connecting the properly set abstract system, format system and concrete system is defined as a tendency system.

[Information Processing Procedure]

Figure 3:
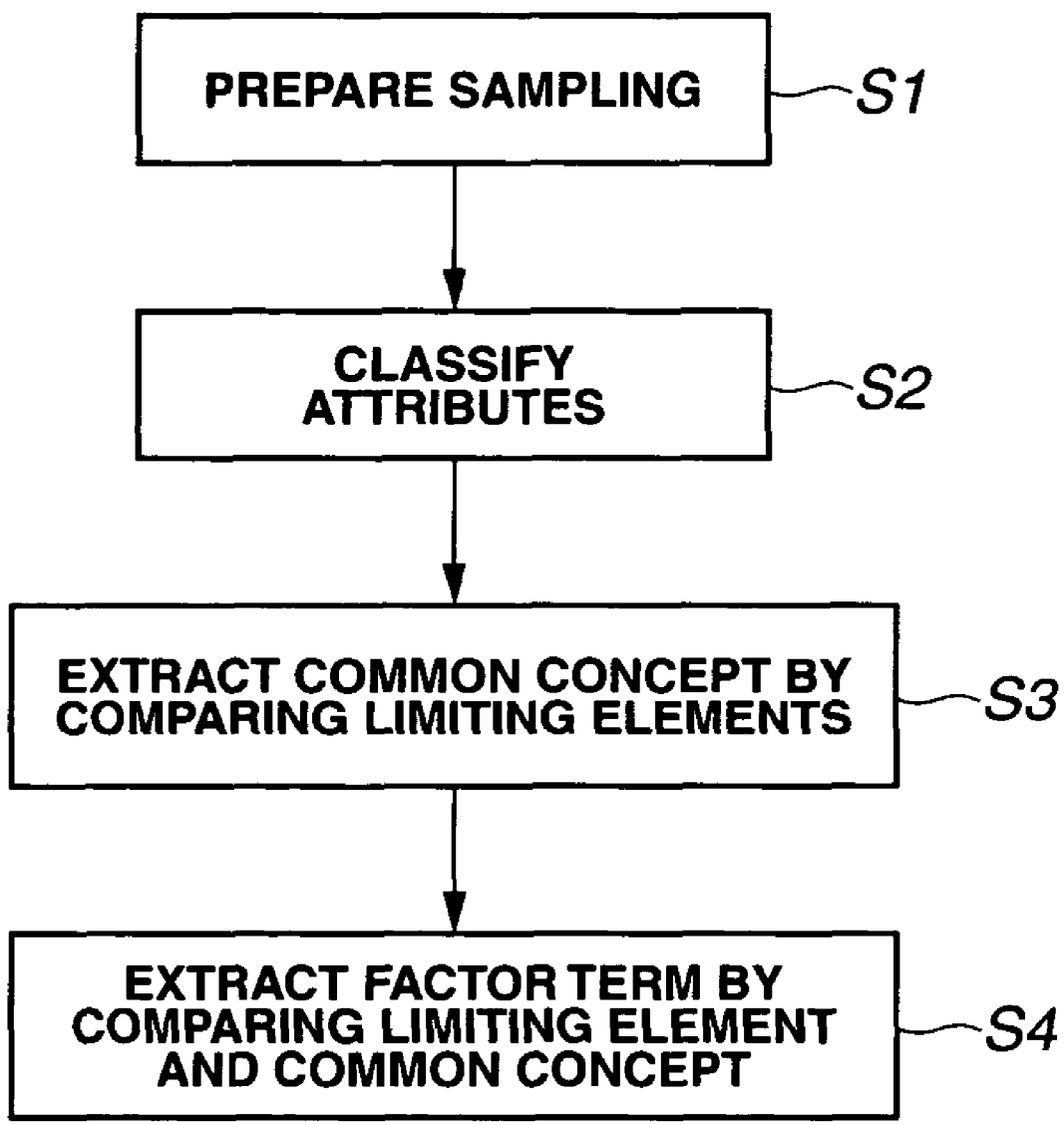
FIG. 3 is a flowchart showing an information processing procedure according to the embodiment of the present invention.

The first embodiment is arranged such that the factor term of defining the special phenomenon is extracted using the common concept after the common concept of defining the complicated phenomenon is extracted. It is necessary to prepare several combinations (hereinafter referred to as sampling) of a phenomenon (hereinafter referred as attribute) and a parameter (hereinafter referred as limiting element) of a system which realizes the attribute, in order to accomplish the extraction of the common concept. By classifying these attributes into several groups and by comparing the parameters, a common concept, which can most preferably explain all phenomena, is extracted. In the case that the common concept is applied to a special attribute, the factor term of realizing the phenomenon inherent in the attribute takes the limiting factor except for that of the common concept. Accordingly, as shown in FIG. 3 the procedure of information processing is constructed by the following four steps.

Step S1: preparing sampling.

Step S2: classifying attributes.

Step S3: extracting the common concept by comparing the limiting elements.

Step S4: extracting the factor term by comparing the special attribute or the limiting element of the classified special group with the common concept. In the case that the common concept traverses the system hierarchy, the steps are repeatedly utilized. These steps are stored in a computer system (an information processing apparatus) including an input device and a display unit in the form of software.

(Preparation of Sampling)

At step S1 of preparing sampling, sampling of phenomena as to presently grasped objects is prepared. However, in the case that the sampling of the compared object has a deviation, the common concept extracted based on this sampling deviates into an attribute and has a tendency of explaining not all phenomena. Therefore, it is necessary to prepare a sampling which does not cause a deviation in attribute. In order to prepare such a preferable sampling, a combination of limiting elements of all case or a combination of limiting elements using an orthogonal table is prepared so as not to cause the deviation of the sampling, and a response of the attribute with respect to the combination is searched.

Figure 4:
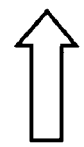
FIG. 4 is a view showing an orthogonal table for preparing samplings according to the embodiment of the present invention.

FIG. 4 shows an example of the orthogonal table. An orthogonal table is a table which is prepared such that all levels of other limiting elements are equally combined when a special level of an allocated limiting element is focused. Accordingly, the maximum value and the minimum value of each limiting element constituting the limiting elements are set, and a distance between the maximum value and the minimum value is divided into several parts according the number of levels of the selected orthogonal table. Further, the divided parts are allocated on the orthogonal table.

In the case that there is provided a simulator which reproduces a attribute indicating a relationship between an input and an output by simulating the system defined by the plurality of limiting elements, it is preferable that the operation is effectively executed by linking it with the simulator. The simulator may be stored in the same calculation apparatus and may be connected to other apparatus by wire.

(Classification of Attributes)

At step S2 of classifying the attributes, a hierarchical clustering is employed. A clustering is a generic name of an object classifying method of producing a cluster by gathering similar objects from a group in which different objects are mixed, in order to effectively produce a meaningful system. A hierarchical clustering thereof is a method of producing a hierarchy so that groups construct nesting. In the first embodiment, a clustering is executed by setting a similarity of the tendency of the attribute as a criterion of a similar object.

The reason for employing the hierarchical clustering in the first embodiment is that the system grasped as an object is based on a hierarchical classification which is regarded as the most understandable system, and it is not previously known how many hierarchy levels and clusters in the tendency system in case of understanding the relationship among hierarchical systems exist, as discussed in the technical concept of the first embodiment. For example, in the case that a non-hierarchical clustering is executed, a threshold or the like is previously set, and the clustering is executed as to objects within the threshold. This threshold setting produces a tendency that an established concept is introduced in the clustering. If such an established concept is introduced in the clustering, the obtained result is limited by the established concept, and therefore it becomes difficult to accurately execute the classification of the systems. Hereinafter, there is discussed the hierarchical clustering method.

In hierarchical clustering, the producing of clusters is executed by combining individuals into a pair one by one using a similarity or dissimilarity as a criterion and by raising the cluster from a small cluster to a large cluster. Accordingly, the procedure of the cluster producing is constructed by two steps of a similarity (dissimilarity) defining step and a cluster producing step. Herein, there are defined a set $X=\{x_1, x_2, \ldots, x_n\}$ indicative of all individuals constructed by individuals xi ($1 \leq i \leq n$), and a similarity $d(x_i, x_j)$ between individuals $x_i$ and $x_j$ where $1 \leq x_i, x_j \leq n$, $x_i \neq x_j$, and $x_i, x_j \in X$. On this definition, the algorism of the hierarchical clustering is referred as Agglomerative Hierarchical Clustering (AHC) and is represented as follows.

(I) n number of clusters (n individuals), which are initially set, are defined by the following expression (1).

$$G_i = \{x_i\} \qquad (1)$$
$$d(G_i, G_j) = d(x_i, x_j)$$

where $1 \leq i, j \leq n$, and $i \neq j$.

(II) A pair of clusters, whose similarity is maximum or minimum, is combined.

$$d(G_q, G_r) = \min_{i,j} d(x_i, x_j) \qquad (2)$$

$G_q$ and $G_r$ is eliminated from g, and $G'=G_q \cup G_r$ is added to g. When this treatment is executed, the number of clusters is decreased by 1.

(III) As to all of $G_i \in g$ and $G_i \neq G'$, the similarity $d(G', G_i)$ between clusters is recalculated.

(IV) Hereinafter, operations (II) and (III) are repeated until the number of clusters reaches 1.

Although various similarities (dissimilarities) corresponding to the above-discussed operation (II) of AHC have been proposed, Ward's Method is employed herein. The Ward's Method is premised on an similarity due to Euclidean distance. That is, when a value of the k-th (No. k) element in the number p of elements constructing the individuals $x_i$ is $x_i^k$, a Ward's distance between individuals $x_i$ and $x_j$ is represented by the following expression (3). Herein, an element is a value included in individuals $x_i$.

$$d(x_i, x_j) = \|x_i - x_j\|^2 = \sum_{k=1}^{p}(x_i^k - x_j^k) \quad (3)$$

Setting a centroid with respect to the cluster G as represented by the following expression (4), each constructing element is represented by the following expression (5).

$$M(G) = (M^1(G), M^2(G), \Lambda, M^p(G)) \quad (4)$$

$$M^k(G) = \frac{1}{|G|}\sum_{x_i \in G} x_i^k \quad (5)$$

Herein, defining a square sum of a difference between the centroid of the clusters G and a distance of the respective individuals by the following expression (6), a difference between distances as to two different cluster $G_i$ and $G_j$ are represented by the following expression (7). Accordingly, a cluster coupling rule in the operation (II) of AHC is represented by the following expression (8) such that $G_q$ and $G_r$, which minimize $\Delta E$, are selected.

$$E(G) = \sum_{x_i \in G}\|x_i - M(G)\|^2 \quad (6)$$

$$\Delta E(G_i, G_j) = E(G_i Y G_j) - E(G_i) - E(G_j) \quad (7)$$

$$\Delta E(G_q, G_r) = \min_{G_i, G_j \in g, i \neq j} \Delta E(G_i, G_j) \quad (8)$$

On the other hand, the recalculation of the similarity d(G', $G_j$) of the operation (III) of AHC is represented using d($G_q$, $G_i$) and d($G_r$,$G_i$) which have not being coupled. Defining d($G_i$,$G_j$)=$\Delta E(G_i,G_j)$, the recalculation of the similarity with respect to an initial cluster $G_i$={$x_i$} is represented by the following expression (9).

$$d(G_i, G_j) = d(\{x_i\}, \{x_j\}) = \frac{1}{2}\|x_i - x_j\|^2 \quad (9)$$

When $G' = G_q \epsilon G_r$, $$d(G', G_i) = \frac{1}{|G_q| + |G_r| + |G_i|}\begin{bmatrix}(|G_q|+|G_i|)d(G_q, G_i) + \\ (|G_r|+|G_i|)d(G_r, G_i) - \\ |G_i|d(G_q, G_r)\end{bmatrix} \quad (10)$$

Figure 5:
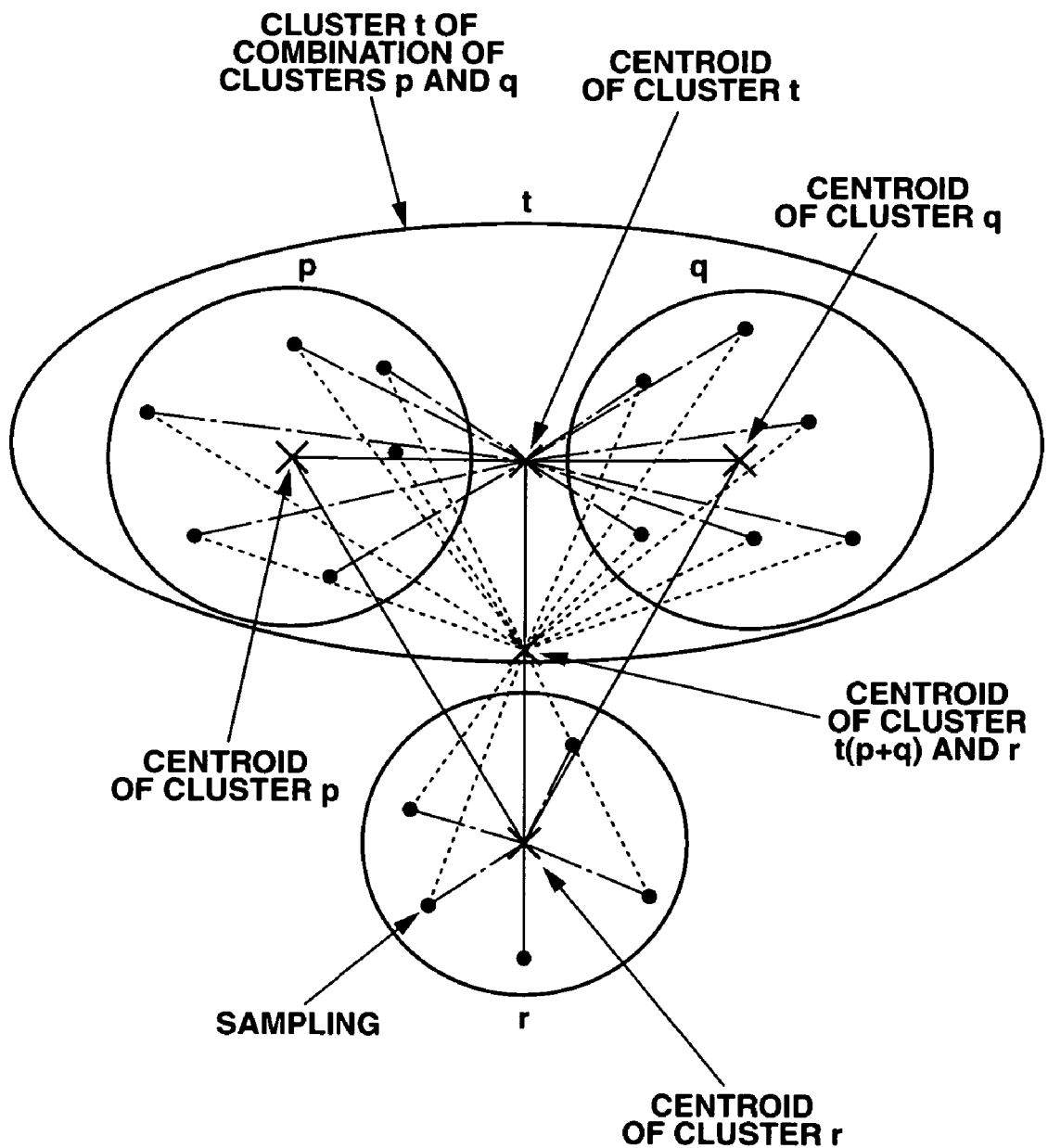
FIG. 5 is a view showing a concrete example of clustering according to the embodiment of the present invention.
Figure 6:
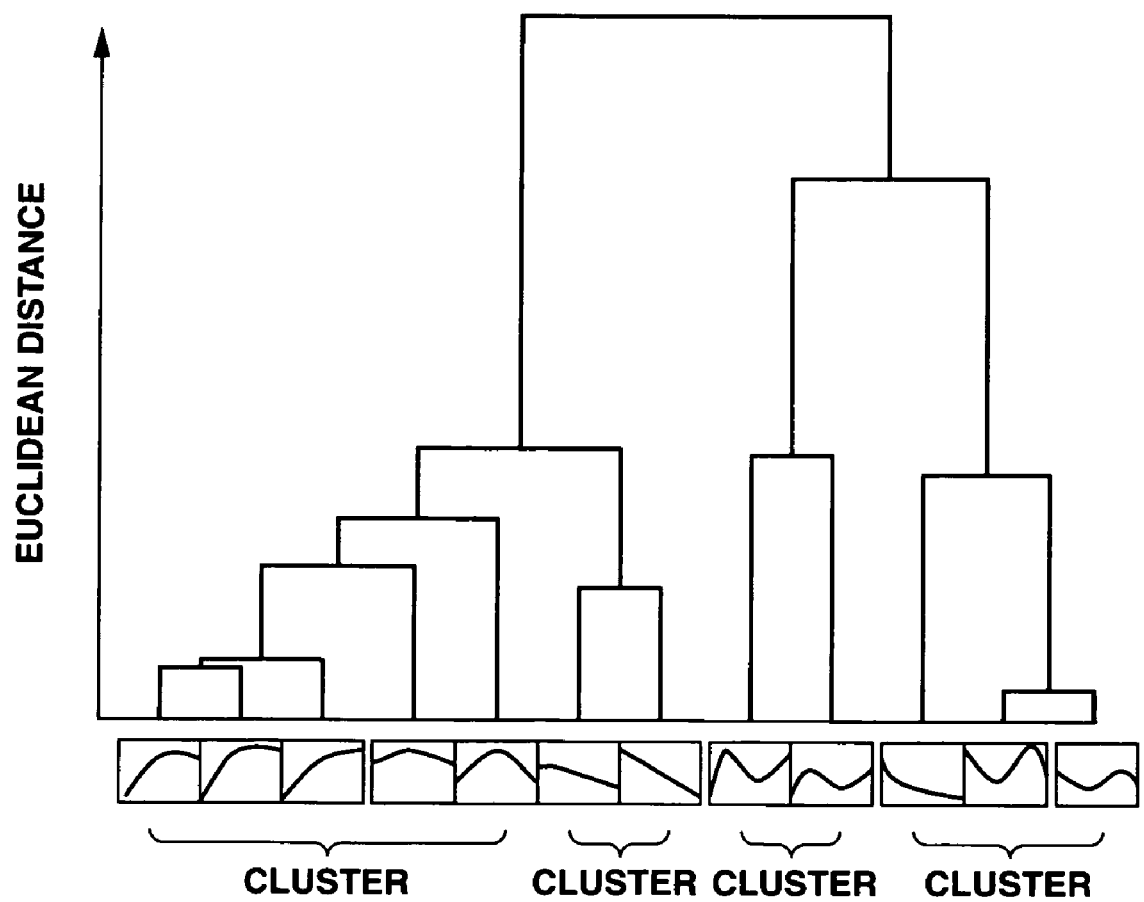
FIG. 6 is a view showing a concrete example of a hierarchical clustering according to the embodiment of the present invention.

As discussed above, the recalculation of the operation (III) of AHC is executed using only the similarity between the clusters without referring to the similarity between individuals. FIG. 5 shows a cluster producing method on the basis of the above-discussed algorism AHC, and FIG. 6 shows an example of the hierarchical clustering.

Summarizing the cluster producing method based on FIG. 5, the following steps are obtained.

Step (A): producing clusters p, q, r, by clustering samplings. This step corresponding to the small circles in FIG. 5.

Step (B): Calculating a centroid of each cluster.

Step (C): Coupling clusters between which the similarity is small (a distance is short). In FIG. 5, by coupling cluster p and cluster q, a new cluster t is produced.

Step (D): Calculating a centroid of the coupled cluster t.

Step (E): Coupling clusters between which the similarity is small (a distance is short).

Step (F): Repeating the steps (C) through (E) until the number of clusters becomes 1.

At step (A), point information, which has not yet clustered, is employed instead of the clusters.

[Extraction of Common Concept]

At step S3 for extracting a common concept by comparing the limiting elements (corresponding to comparing means), after the cause-effect relationship between a relationship between limiting elements existing in each classified hierarchy level and the attribute thereof is extracted, the cause-effect relationship common in the whole hierarchy is found. The cause-effect relationship found herein is referred to as a common concept.

(Extraction of the Cause-Effect Relationship Between a Relationship Between Limiting Elements Existing by the Classified Hierarchy Levels and the Attribute Thereof)

A physical cause-effect relationship between the limiting elements existing by each classified hierarchy level and the phenomenon thereof is extracted. It is not clearly said that the characteristic of the phenomenon is realized by the interrelation between various limiting elements. In other words, the phenomenon is realized through the various relationships by changing the relationship between the limiting elements. If this is a network among the limiting elements for realizing the phenomenon, this network is regarded as a cause-effect relationship. Herein, the network is referred to as a cause-effect network.

Considering one path of the network, there is a possibility that other limiting elements affect the forming of this path. In the case that a path having such a characteristic is searched, it is preferable that a determination in searching such a path is made from the relationship of the limiting elements which includes the influence of other limiting elements, rather than from a pure relationship excluding the influence of other limiting elements.

That is, in the case that the determination of the path is made from the pure relationship excluding the influence of other limiting elements, the determination is made from the magnitude of values, such as the magnitude of degree of relationship between limiting elements or between a limiting element and the phenomenon. Therefore, the physical relationship between the excluded limiting elements and, the path is broken while it is not cleared whether such an exclusion is correct or not. That is, it is hard to say that the cause-effect network is represented as a whole. In contrast to this, in the case that the determination of the path is made from the relationship of the limiting elements which includes the influence of other limiting elements, the exclusion based on the established concept is not executed. Therefore, it is considered that a cause-effect network, which can explain all physical relationships representing the phenomenon itself, is produced.

In order to avoid the complication of producing the cause-effect network, it is necessary to introduce a numeral indicator. Herein, as a scale for measuring the magnitude of the relationship between two liming elements while maintaining the influence of other limiting elements, Pearson product-moment correlation coefficient is employed. In order to extract a cause-effect network of reaching the limiting elements to the phenomenon, it is presumed that the dimension of each limiting element is the same as that of the phenomenon. The each limiting element and the phenomenon set in the same dimension are referred to as a fulcrum of the path constructing the cause-effect network.

Defining that the number of data included in one fulcrum is n, a fulcrum is x, an average of fulcrums x is $\bar{x}$, the other fulcrum is y, and an average of the other fulcrum y is $\bar{y}$, a correlation coefficient r(xy) representing the strength of the relationship between the two fulcrums x and y is represented by the following expression (11).

$$r(xy) = \frac{\frac{1}{n-1}\sum_{i=1}^{n}(x_i - \bar{x})(y_i - \bar{y})}{\sqrt{\frac{1}{n-1}\sum_{i=1}^{n}(x_i - \bar{x})^2}\sqrt{\frac{1}{n-1}\sum_{i=1}^{n}(y_i - \bar{y})^2}} \quad (11)$$

Figure 7:
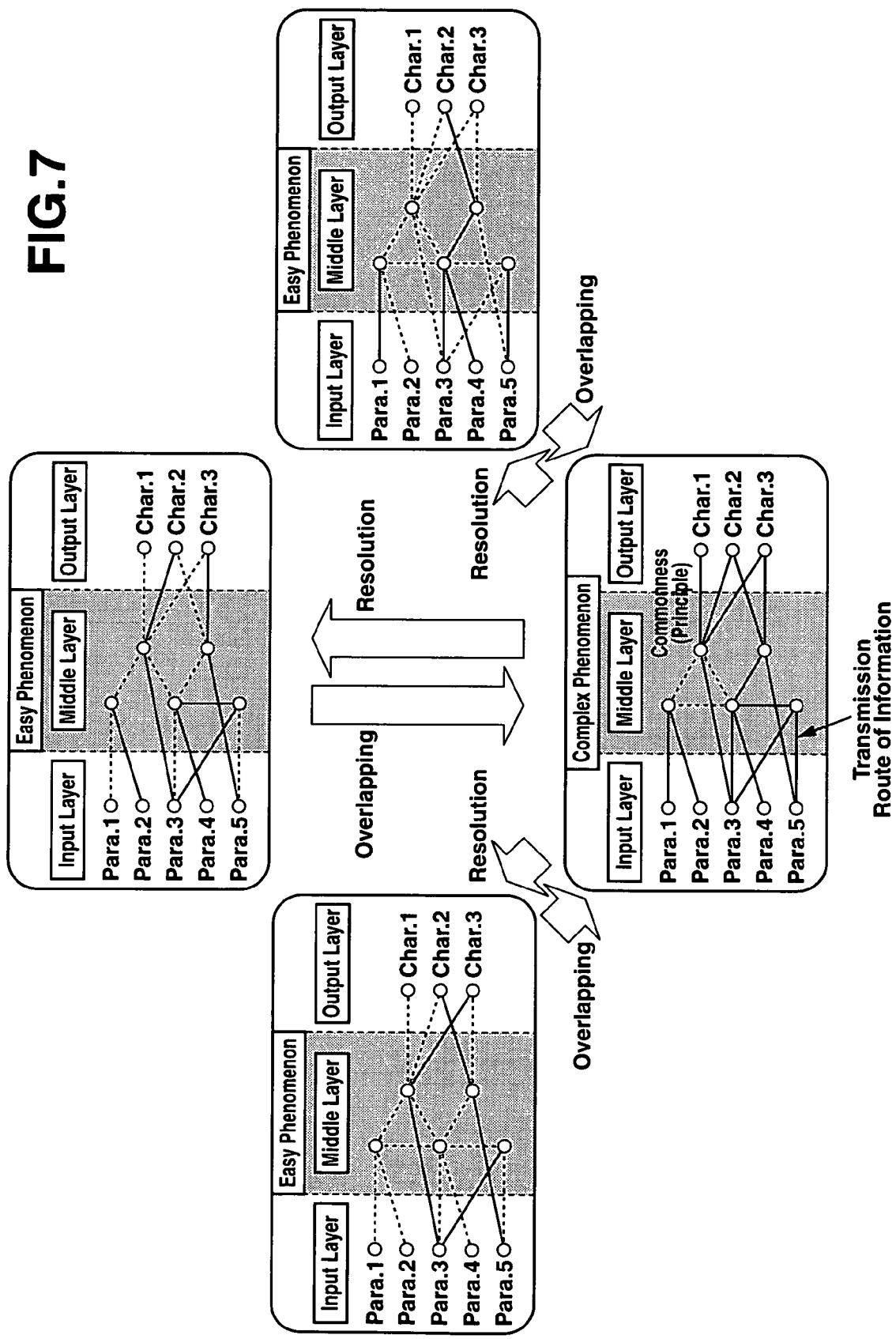
FIG. 7 is a view showing cause-effect networks according to the embodiment of the present invention.

By applying the expression (11) to all the relationships between all fulcrums, it becomes possible to extract all cause-effect networks reaching the phenomenon together with the magnitude of the relationship including the influence of other limiting elements, as shown in FIG. 7. By applying the obtained result to the phenomenon clusters of all hierarchy levels, it becomes possible to grasp a process of gradually stratifying the complicated phenomenon into hierarchical simple phenomena, together with the change of the cause-effect network.

(Extraction of Common Concept)

A complicated phenomenon has a hierarchical structure so as to be gradually divided into simple phenomenon using the physical characteristic as a criterion. Accordingly, it is considered that the cause-effect network changes following the hierarchy level of the phenomenon. A factor of determining a single phenomenon in a hierarchy level and a factor of determining the complexity of the phenomenon are defined as a cause-effect network common in the single phenomenon in all hierarchy levels and a foreign cause-effect network existed between the objective phenomenon and the phenomena at the upper and lower hierarchy levels of the objective phenomenon, respectively, by tracing the hierarchy levels.

In case of the hierarchy process with attribute differentiation of the complicated phenomenon by means of the hierarchical clustering, the lowest hierarchy level is a cluster constructed by one sample. Since the complexity of the phenomenon is intensified as the hierarchy level becomes lowered toward the lowest hierarchy level, there is a characteristic that the commonality becomes weakened as the hierarchy level becomes lowered. On the other hand, although the number of samples constructing a cluster increases as the hierarchy level becomes higher, the number of clusters in a hierarchy level decreases as the hierarchy level becomes higher. Therefore, there is a characteristic that a lot of commonalities including noises exist.

Accordingly it is considered that there exists a hierarchy level, which is most preferable for extracting a common concept from the above-discussed relationship. Hereinafter, there is discussed a method of specifying a hierarchy level which can extract a common concept and extracting the common concept from the specified hierarchy level.

Firstly, a hierarchy level preferable for extracting a common concept is specified. Herein, sensibility S and SN ratio η of a correlation coefficient for a path p is utilized. When it is defined that an objective hierarchy level is i, the number of clusters included in the hierarchy level is n, a correlation coefficient in path p of the m-th cluster in the hierarchy level is $r_{ipm}$, a superposition correlation coefficient $\bar{r}_{ip}$ is represented by the following expression (12).

$$\bar{r}_{ip} = \frac{1}{n}\sum_{m=1}^{n} r_{ipm} \quad (12)$$

If one of cause-effect networks common in the hierarchy levels is the path p, the sensibility S of the correlation coefficient is represented by the following expression (13) based on the expression (12).

$$S = \bar{r}_{ip}^2 \quad (13)$$

A whole fluctuation $S_t$ of the correlation coefficient at the path p of each cluster in a hierarchy level i is represented by the following expression (14).

$$S_t = \sum_{m=1}^{n}(r_{ipm} - \bar{r}_{ip})^2 \quad (14)$$

Defining that an Euclidean distance partitioning each cluster is $d_i$ and an average Euclidean distance is $\bar{d}_i$, a fluctuation $S_\beta$ of the correlation coefficient of the path p is represented by the following expression (15).

$$S_\beta = \frac{\left\{\sum_{m=1}^{n}(d_{im} - \bar{d}_i)(r_{ipm} - \bar{r}_{ip})\right\}^2}{\sum_{m=1}^{n}(d_{im} - \bar{d}_i)^2} \quad (15)$$

Therefore, an error variance Ve of the path p is represented by the following expression (16).

$$V_e = \frac{S_T - S_\beta}{n - 1} \quad (16)$$

An SN ratio of the correlation coefficient as to the path p in each cluster included in the hierarchy level i is represented by the following expression (17).

$$\eta = \frac{S}{V_e} \quad (17)$$

Since the common concept is a common cause-effect network which can explain all the phenomena, a hierarchy level, in which the sensibility S represented by the expression (13) is large in all common paths and the SN ratio η represented by the expression (17) is also large, is a hierarchy level preferable for extracting the common concept. It is necessary that the hierarchy level of extracting the common concept is selected from the hierarchy levels constructed Euclid distance shorter than the maximum Euclid distance causing a branching when the tree diagram is searched from the uppermost level to a lower level of the hierarchy.

Figure 8A:
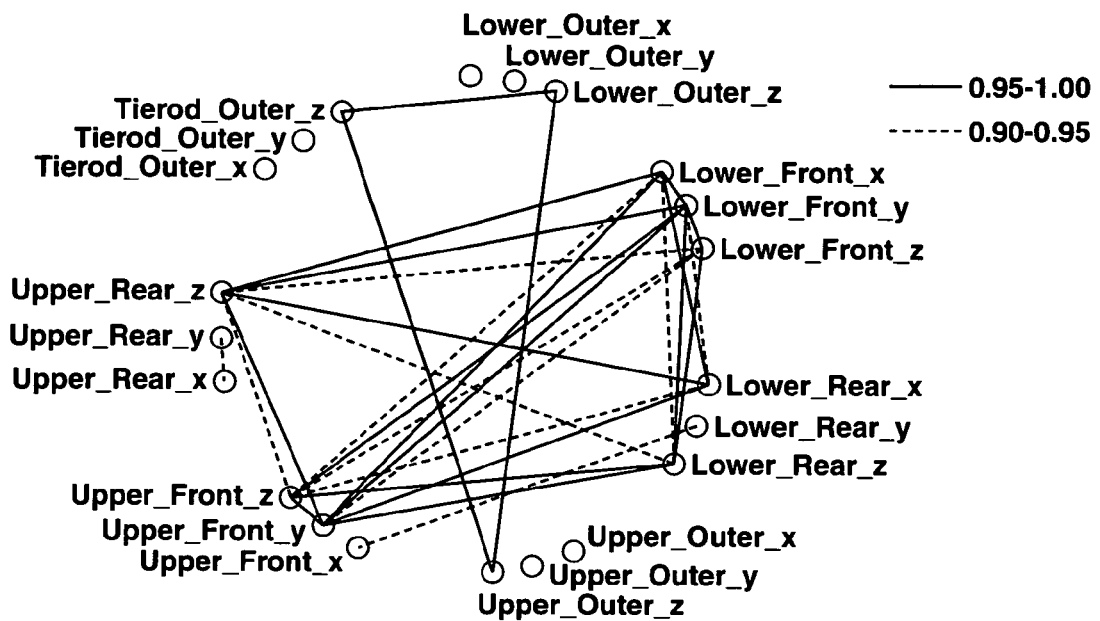
FIGS. 8A and 8B are views showing examples of a cause-effect network display method according to the embodiment of the present invention.
Figure 8B:
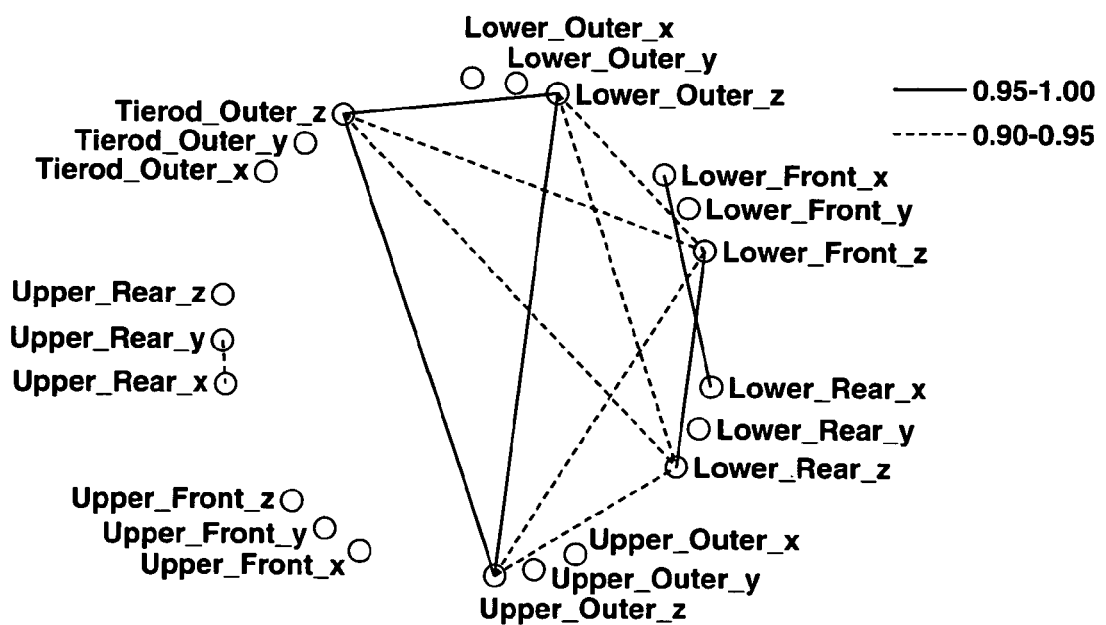
Figure 9:
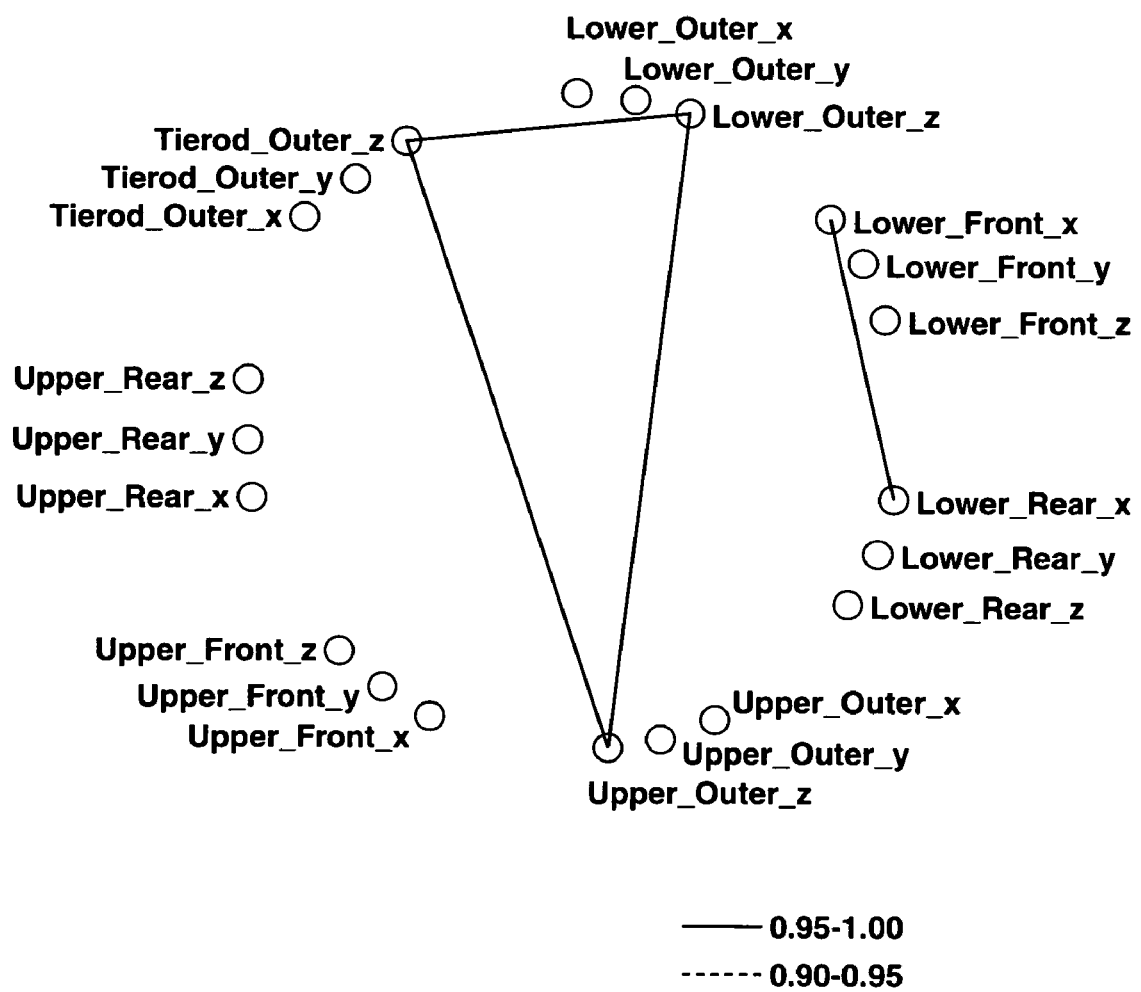
FIG. 9 is a view showing an example of the cause-effect network display method according to the embodiment of the present invention.

In the obtained hierarchy level preferable for extracting the common concept, the common cause-effect network treated as the common concept corresponds to the path p in which the sensibility S of the correlation coefficient is represented by the expression (13). FIG. 7 shows an image of the extraction of common concept. FIG. 8 shows an example of a method for displaying networks. FIG. 9 shows an example of a method for displaying the common concept common in these networks.

A method of displaying the limiting elements is arranged to place the limiting elements on a circle and to connect the limiting elements by a straight line. The limiting elements may be placed at positions except for the positions on the circle. Instead of a method of using several kinds of lines, a method of using lines of different color or a method of using lines of different thickness may be employed. The common concept, that is, a common network shown in FIG. 9 is always included in networks of each cluster shown in FIG. 8.

(Extraction of Factor Term)

Figure 10A:
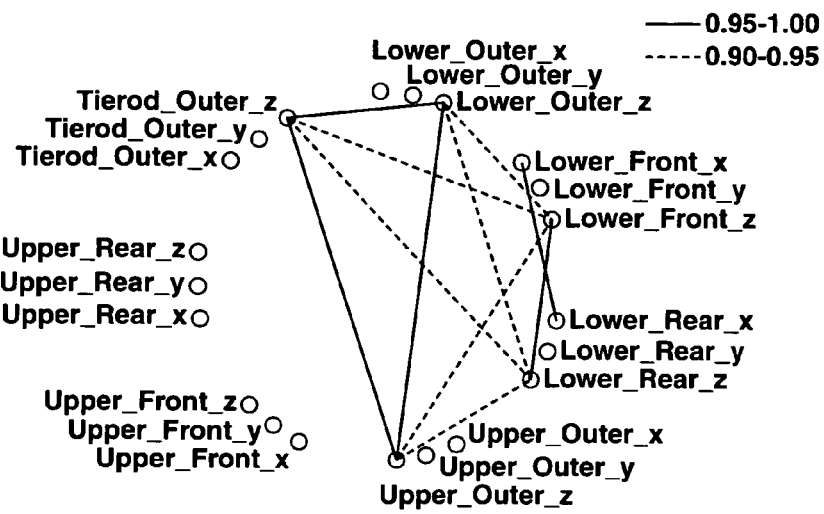
FIGS. 10A, 10B and 10C are views showing examples of extracting a factor term using the cause-effect network of the first embodiment according to the present invention.
Figure 10B:
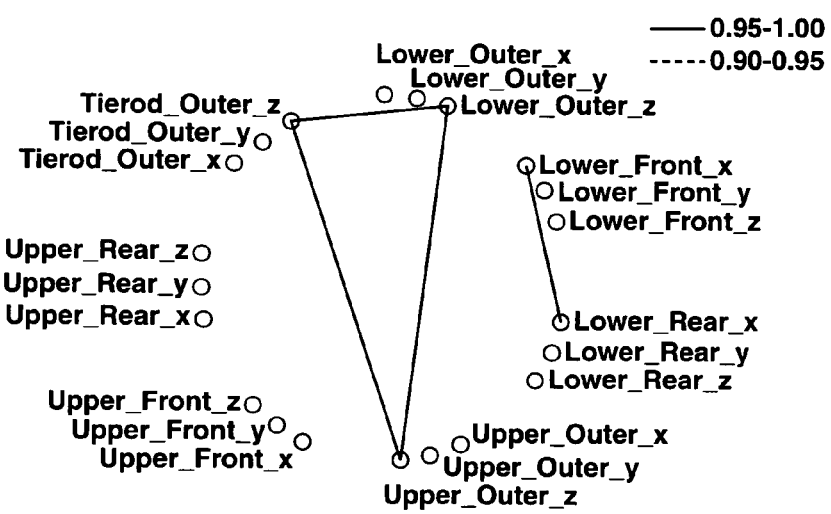
Figure 10C:
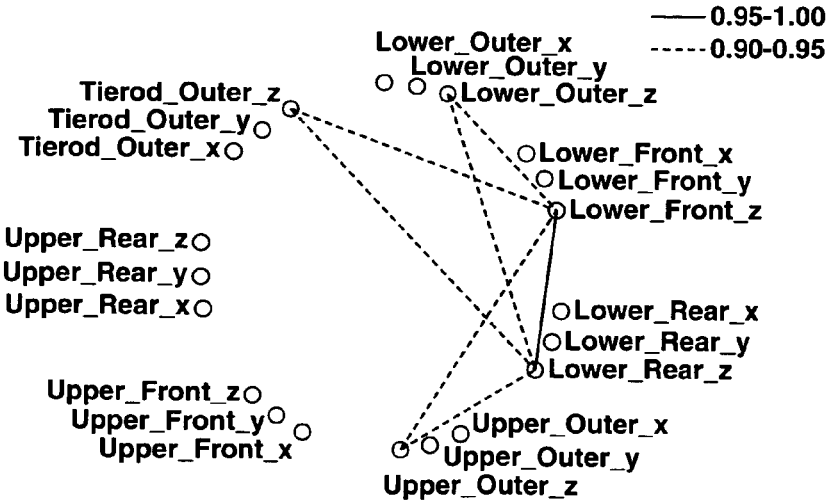

The factor term is extracted by executing step S4 of extracting the factor term by comparing the special attribute or the limiting element of the classified special group with the common concept. The factor term is a special form of the limiting elements based on the common concept. Accordingly, by comparing the common concept extracted at step S3 of extracting the common concept with the cause-effect network of the special form, a part not applicable to the common concept is the factor term. FIG. 10 shows a display example of the factor term extraction.

CONCRETE EXAMPLE

There is shown a concrete and preferable example of according to the embodiment of the present invention. Herein, there is discussed a multi-link suspension which is a type of a vehicle suspension as a preferable example. The attribute discussed in this example is a change of a camber angle when tires stroke, and limiting elements are installation points M1 through M5 (herein, referred to as geometry) of each link of the multi-link suspension shown in FIG. 11.

Figure 12:
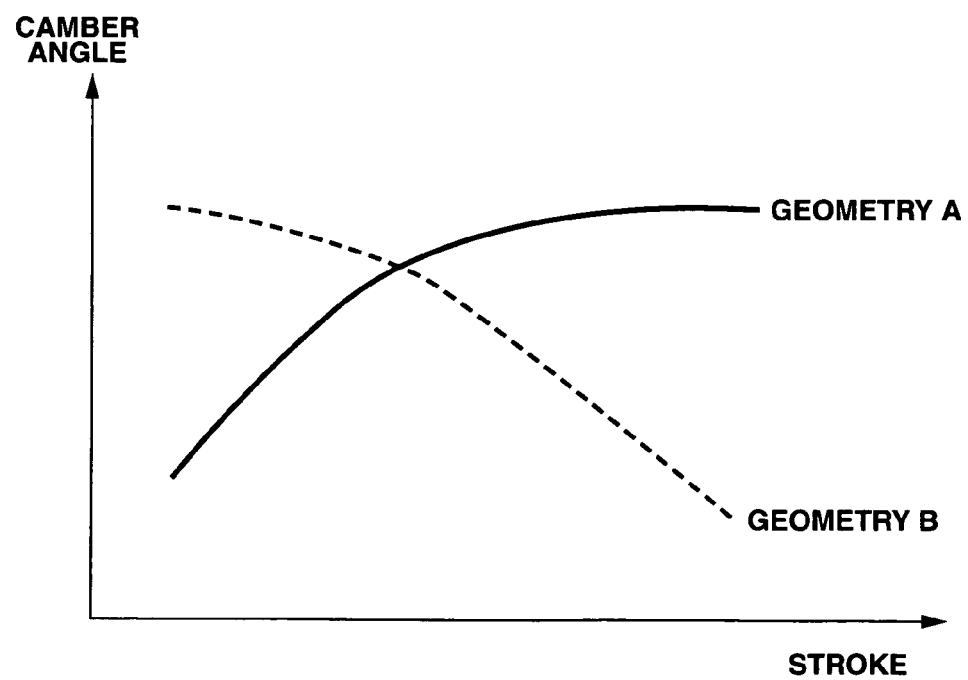
FIG. 12 is a graph showing a difference of attributes due to a difference of limiting element in the suspension of the concrete example.

The multi-link suspension largely changes the attribute (a change of the camber angle) according to the difference of the limiting elements (geometry) as shown in FIG. 12. In designing an actual suspension, a design target value of the attribute is previously set, and an operation for finding limiting elements, which satisfies the design target value, is executed. Accordingly, a lot of parametric operations are executed regardless of a mechanical linkage relationship of the suspension, and it is not clear and not understood how the optimal structure was determined.

When another multi-link suspension is designed without sufficient understanding of the mechanical linkage of such a suspension, similar parametric operations are executed and are ineffective. This encounters the difficulty in creasing a new suspension. Herein, there were executed an extraction of a common concept which provides an understanding of a relationship between the attribute of a multi-link suspension and limiting elements and a way to a creation of a new suspension structure, and an extraction of a factor term for understanding the phenomenon specific to the structure.

(Preparation of Sampling)

Figure 11:
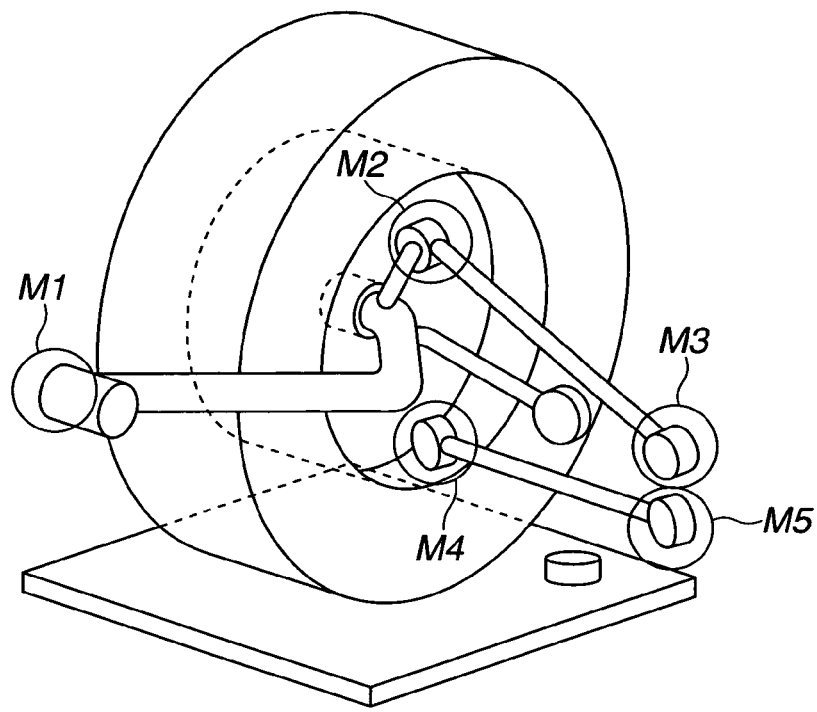
FIG. 11 is a perspective view showing a multi-link suspension of a concrete example.

By varying the geometry of the multi-link suspension shown in FIG. 11 within a geometry range shown in FIG. 13 according to the orthogonal table L81, a linkage calculation is executed according to the varied geometry value to calculate the camber angle and to prepare samplings.

Figure 14:
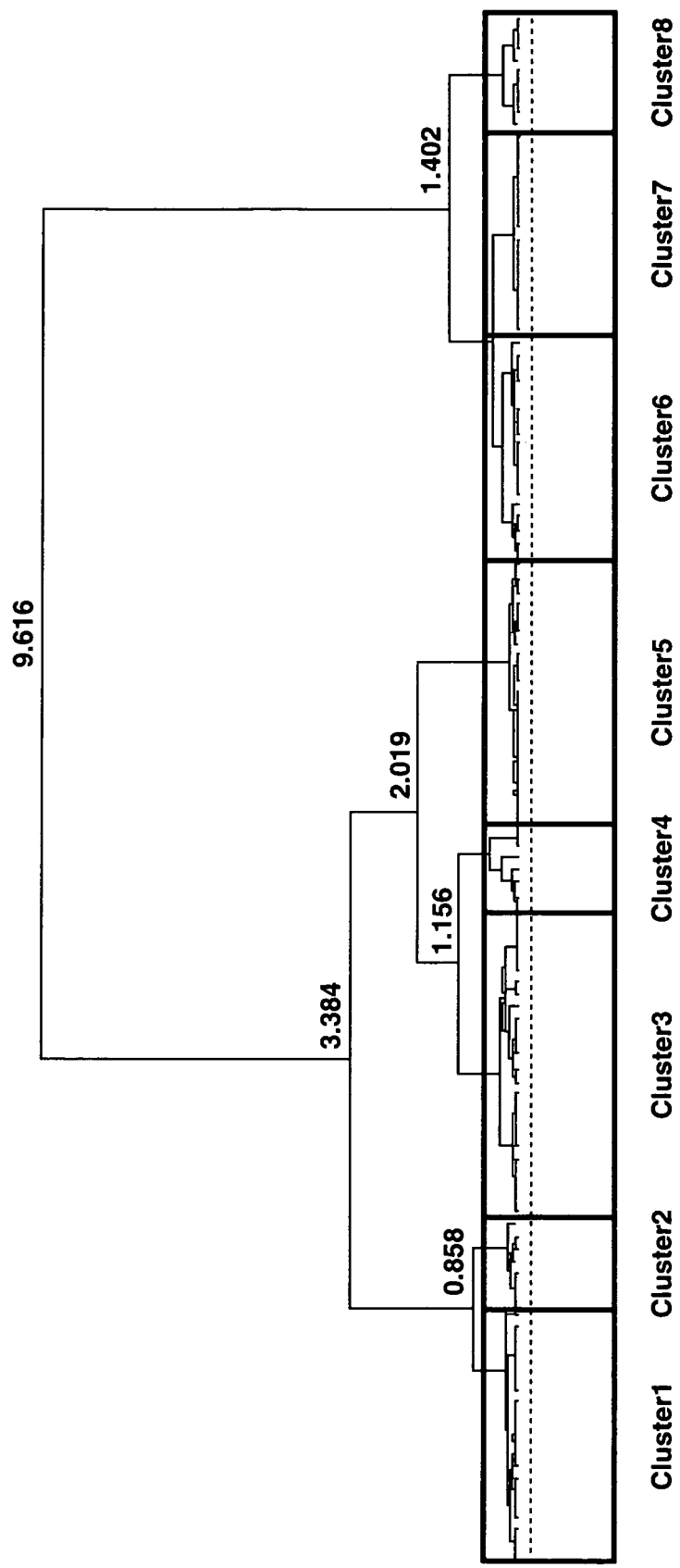
FIG. 14 is a tree diagram of the attributes obtained from the clustering in the concrete example.
Figure 15A:
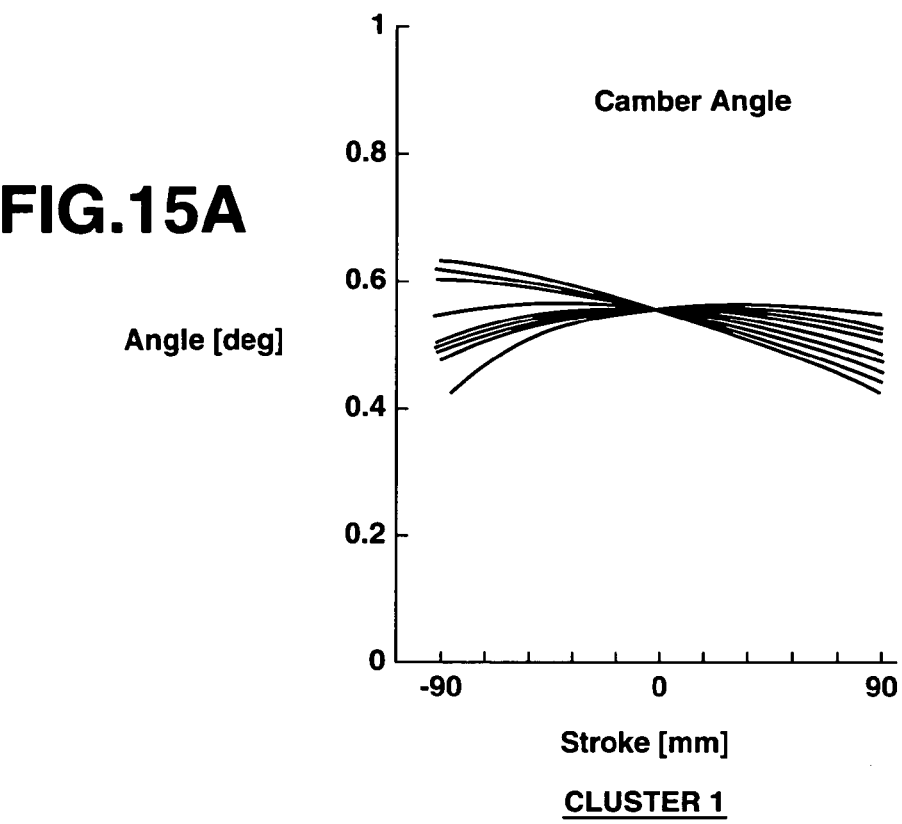
FIGS. 15A and 15B are graphs showing the attributes of the clusters in a classified hierarchy level.
Figure 15B:
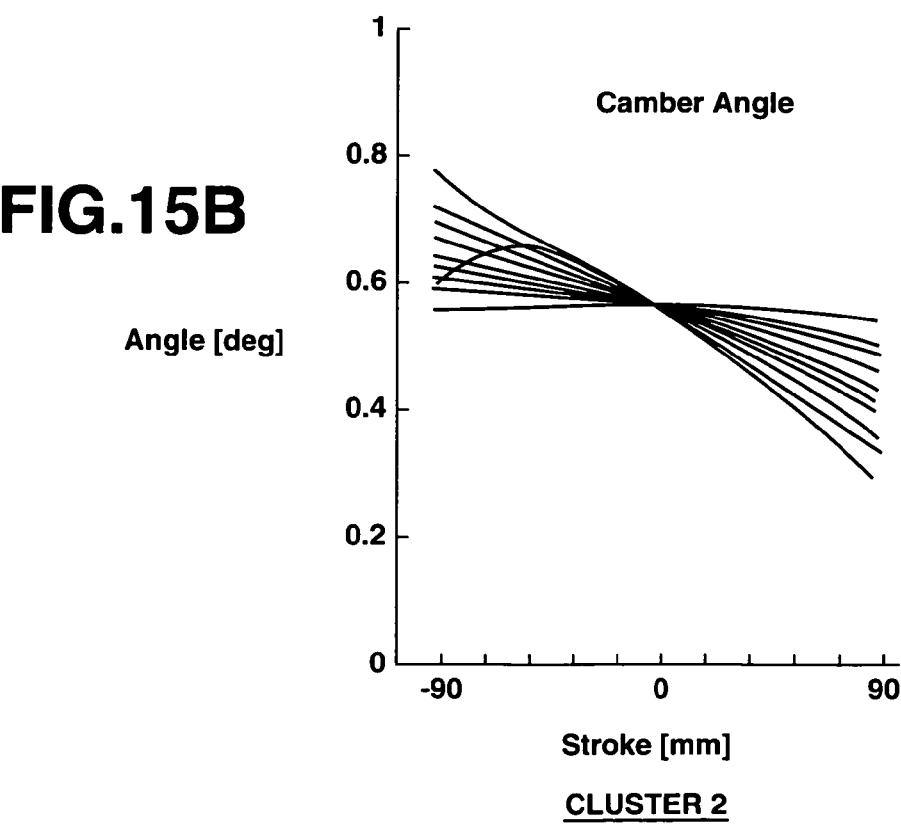

The samplings prepared in the above preparation of samplings are classified by the attribute, that is, camber angle. FIG. 14 shows a tree diagram of the attribute obtained from the classification result. FIG. 15 shows an attribute of groups (hereinafter, referred to as clusters) in a classified hierarchy level.

(Extraction of Common Concept)

From the classification result obtained from the above attribute classification, a hierarchy level, from which the common concept is extracted, is specified according to the above-discussed common concept extracting method. A cause-effect network between limiting elements of the respective clusters existed in the specified hierarchy level is extracted using the above-discussed common concept extraction method. The cause-effect network obtained from the result of the above extraction is represented using a limiting element representing means.

Figure 16A:
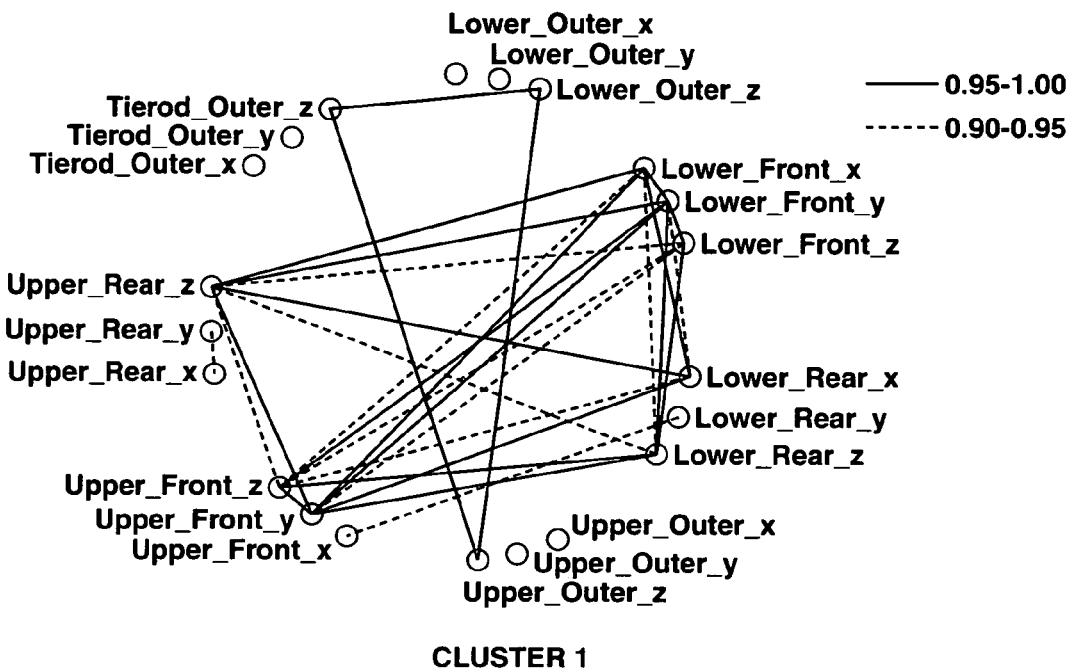
FIGS. 16A and 16B are diagrams showing several examples of the cause-effect network between the limiting elements in the concrete example.
Figure 16B:
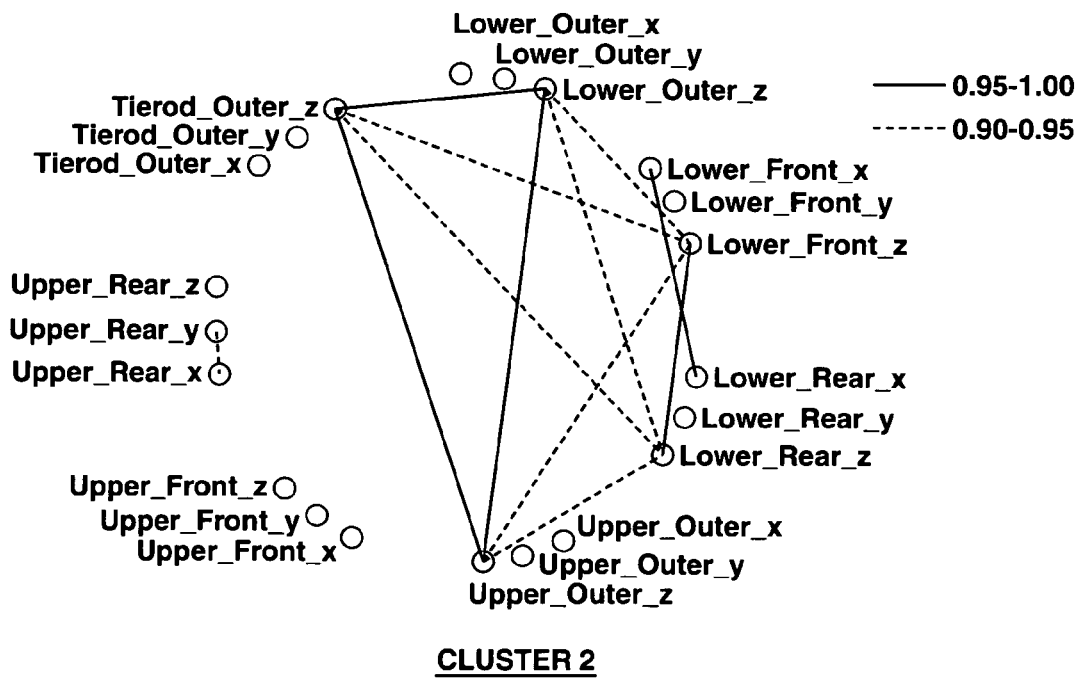
Figure 17A:
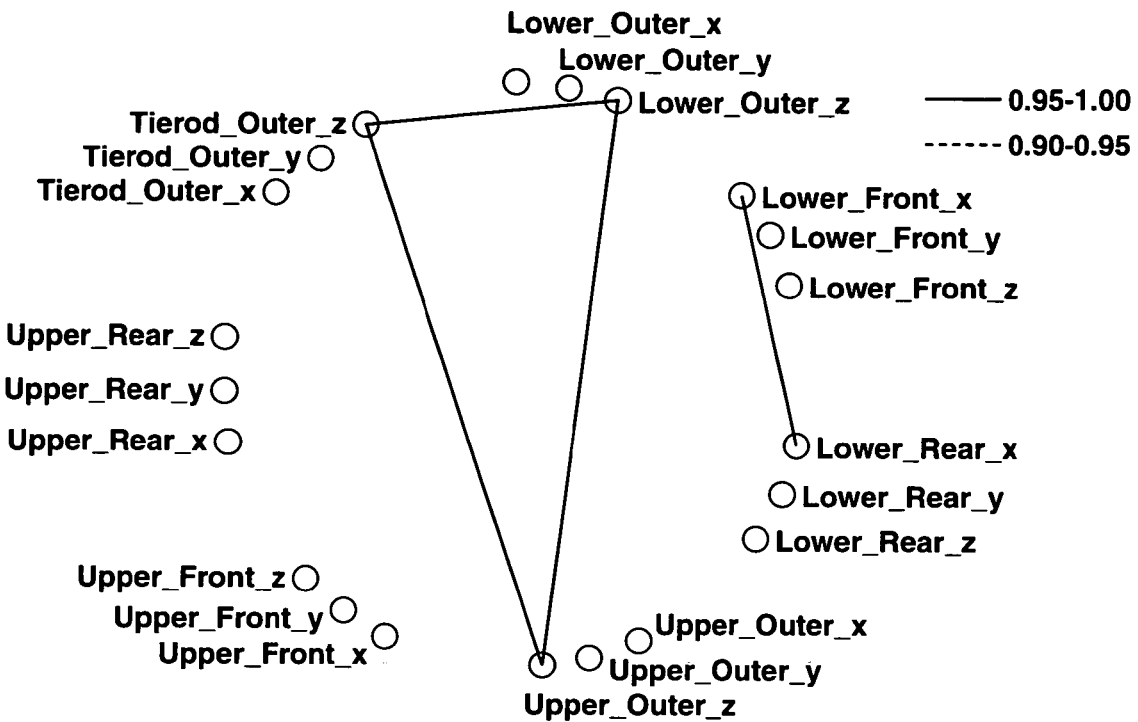
FIG. 17A is a view showing a common concept in the cause-effect networks common in the concrete example.
Figure 17B:
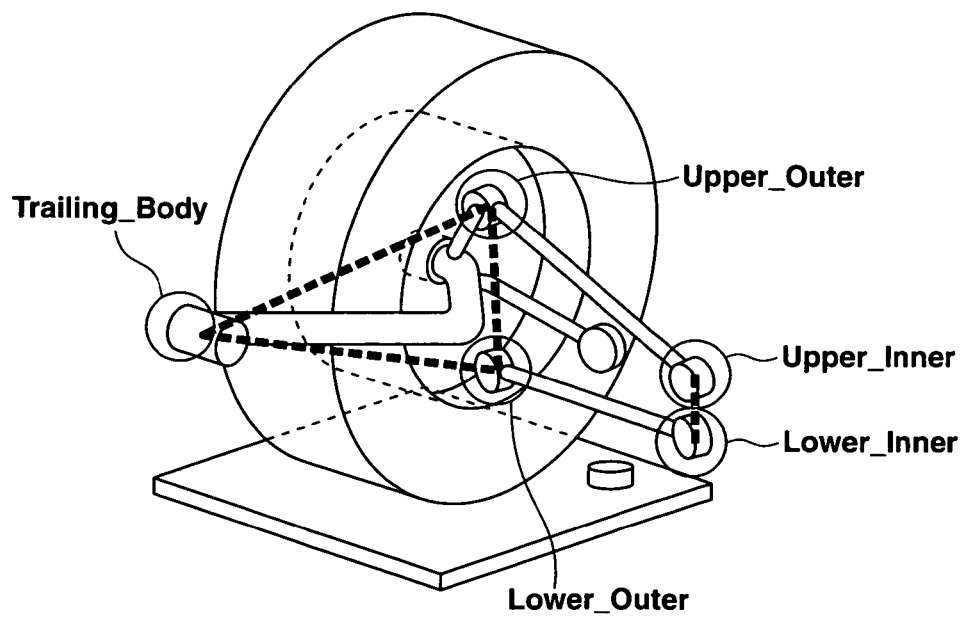
FIG. 17B is a view showing parts of the suspension which correspond to the common concept.

FIGS. 16A and 16B show several examples of cause-effect network between the limiting elements. In this representing method, a solid line represents a relationship between the limiting elements which have the highest influence of realizing the characteristic of an attribute shown in the cluster, a dotted line represents a relationship between the limiting elements which have the secondary highest influence of realizing the attribute. Herein, the common concept is a cause-effect network existed in all clusters. Accordingly, the extraction of the common concept corresponds to steps of comparing the representation of the limiting elements in the cluster and of defining the common cause-effect network. FIGS. 17A and 17B show the representation of the obtained common concept.

Figure 18:
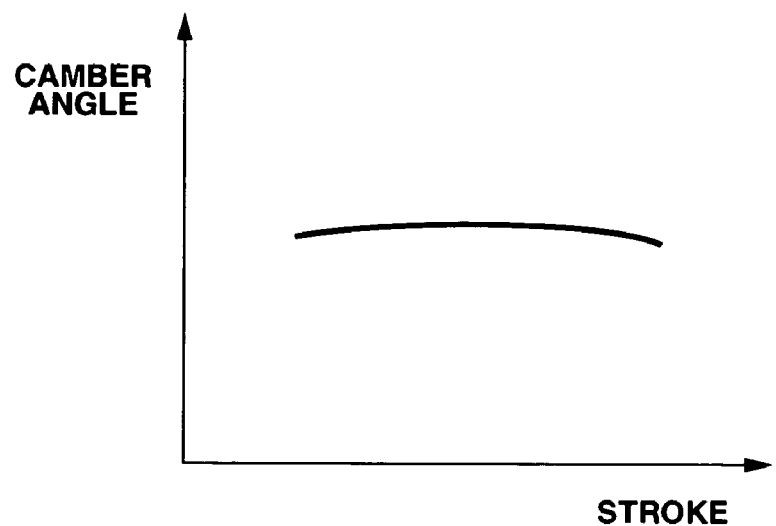
FIG. 18 is a graph showing an attribute between a stroke and a camber angle of the suspension in the concrete example.
Figure 19:
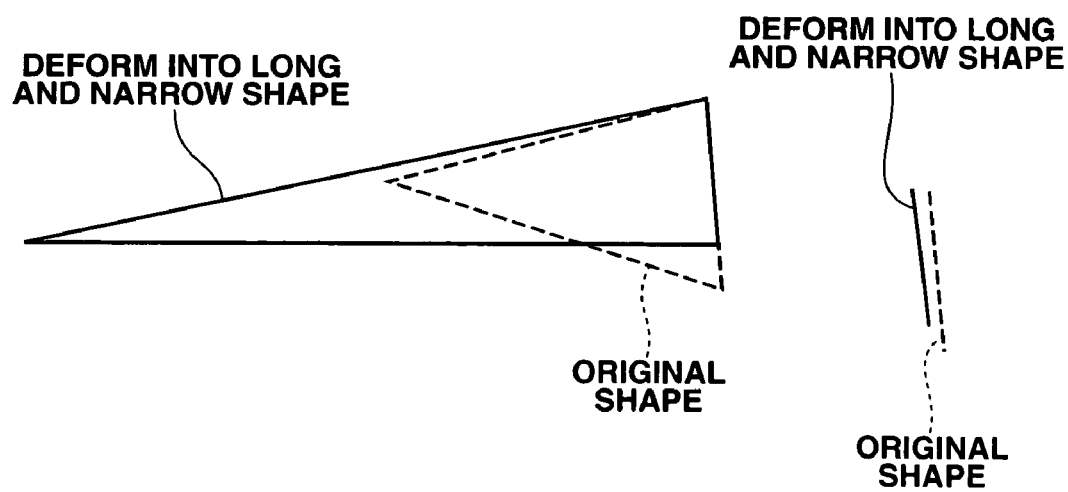
FIG. 19 is a view showing a shape of the multi-link suspension corresponding to an attribute of the concrete example.
Figure 20:
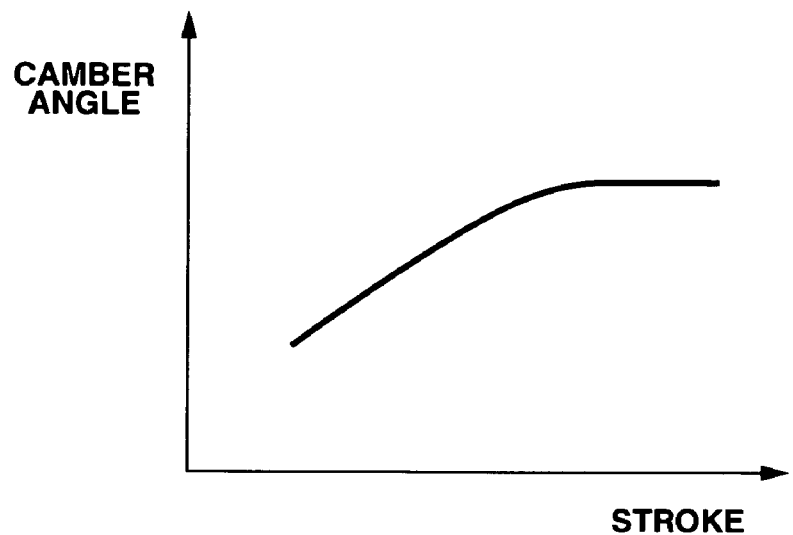
FIG. 20 is a graph showing an attribute between a stroke and a camber angle of the suspension in the concrete example.
Figure 21:
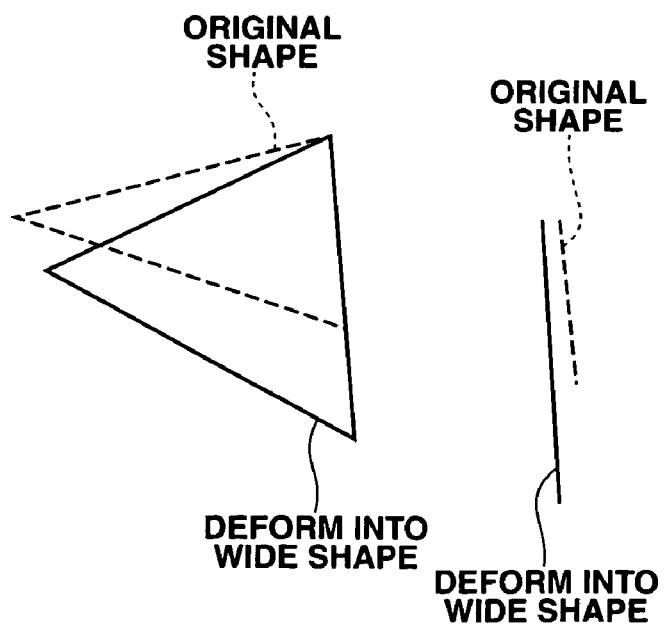
FIG. 21 is a view showing a shape of the multi-link suspension corresponding to an attribute of the concrete example.

The obtained common concept is a relationship of the geometry necessary for controlling the camber angle of the multi-link suspension. More specifically, in order to realize the desired camber angle, by designing upon taking account of a relationship (tendency) between geometries, which corresponds to the common concept, it becomes possible to ensure minimum requirements for the multi-link suspension. For example, when it is desired to realize the tendency of the attribute shown in FIG. 18, the design work may be executed with setting the relationship of the limiting elements, which become the common concept, at the tendency shown in FIG. 19. When it is desired to realize the tendency of the attribute shown in FIG. 20, the design work may be executed with setting the relationship of the limiting elements, which become the common concept, at the tendency shown in FIG. 21.

(Extraction of Factor Term)

Figure 22:
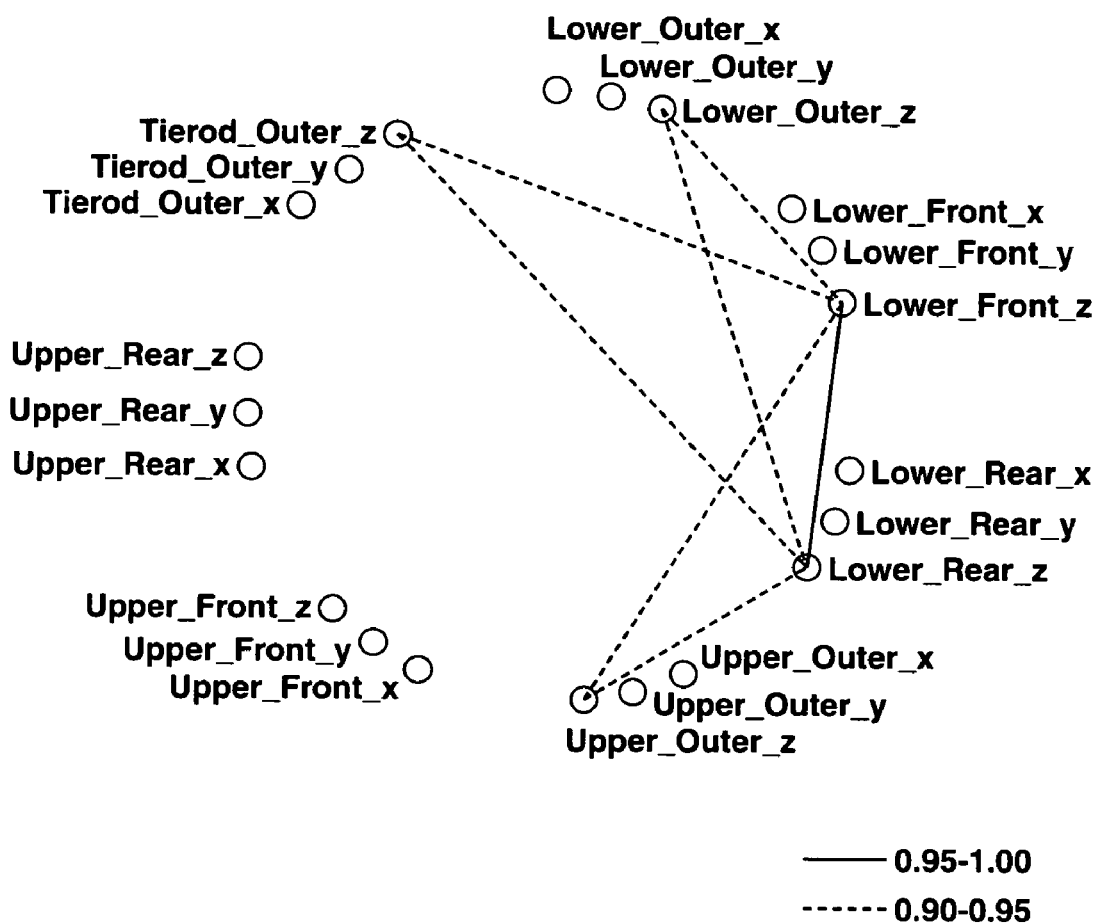
FIG. 22 is a diagram showing a cause-effect network of the limiting elements of the factor term of a cluster in the concrete example.

The common concept is eliminated from the representation of the limiting elements of the special cluster. By this eliminating operation, a desired change of a camber angle is realized by adding the special tendency of other limiting elements to the tendency of the limiting elements of the common concept of realizing the change. FIG. 22 shows a cause-effect network of the limiting elements of the factor term.

As discussed above, the first embodiment according to the present invention gains the following effects.

(1) When there is a set of attributes indicative of relationships between an input and an output, the set is classified on the basis of a tendency of the attributes, the limiting elements corresponding to the classified attributes are indicated, and the limiting elements of an indicated classification are compared with the limiting elements of other indicated classification. That is, by comparing the attributes classified on the basis of the tendency with the limiting elements defining the attributes, it becomes possible to grasp the limiting elements of defining the tendency, and to grasp a technical meanings of the classification.

(2) The common concept is extracted on the basis of the limiting elements common in the classifications. Therefore, it becomes possible to extract the common concept from the complicated phenomenon.

(3) The hierarchical clustering technique for clustering the set into hierarchy levels on the basis of the tendency is used in the present invention. That is, taking account that the objective system is based on the hierarchical classification, it becomes possible to obtain the most understandable system by executing the hierarchical clustering. Further, taking into account that it is not previously known how many hierarchy levels exist in the system, it is not necessary to previously set a threshold value, and it becomes possible to obtain a result not limited by an established concept.

(4) The common concept is extracted on the basis of the limiting element common among the hierarchy levels. Therefore, it becomes possible to extract the common concept which defines the hierarchy levels.

(5) The common concept is extracted on the basis of the limiting elements common in a hierarchy level. Therefore, it becomes possible to extract the common concept which defines a hierarchy level.

(6) A factor term is extracted by comparing one of the specified attribute of the limiting element with the common concept. Therefore, it becomes possible to extract the limiting element which is one of a special attribute and a factor of defining the special classification.

(7) The sampling of the system is executed without generating a deviation in combinations of the limiting elements. Therefore, it becomes possible to compare the limiting elements without generating the deviation of the attributes, and to extract the common concept without generating the deviation of the attributes.

(8) An orthogonal table is used when the sampling is executed. Therefore, in the case of patting attention to the special standard of a placed limiting element, the sampling is produced such that all of criteria of other limiting elements are equally combined. Accordingly, it becomes possible to compare the limiting elements without generating the deviation in attributes and to extract the common concept without generating the deviation of the attributes.

(9) The attributes are classified on the basis of a similarity in Euclidean distance. Therefore, it becomes possible to represent the multi-dimensional limiting elements in an orthogonal coordinate system on the basis of the similarity and to easily compare the limiting elements in the understandable form.

(10) The attributes are classified on the basis of a similarity in distance between a centroid of a classification and each attribute. Therefore, it becomes possible to search the complicated phenomenon using a scale of a distance and to easily compare the limiting elements in the understandable form.

(11) The limiting elements are placed on a two-dimensional plane. Therefore, it becomes possible to easily compare the limiting elements in the understandable form.

(12) The limiting elements are placed on a polygonal shape. Therefore, when the limiting elements are connected by cause-effect networks, it becomes possible to connect the limiting elements by straight lines and to easily understand the cause-effect networks.

(13) The limiting element indicating section indicates all limiting elements. That is, cut-off based on an accomplished concept is not executed, and therefore it becomes possible to accurately explain the physical relationship which directly indicates the phenomenon.

(14) The limiting element indicating section constructs a cause-effect network indicative of a relationship between the limiting element and the attribute by placing the limiting elements and the attributes in the same dimension. Therefore, it becomes possible to represent a physical relationship between the limiting elements and the attributes in the understandable form.

(15) Correlation coefficients indicative of magnitudes of the relationships between all fulcrums are calculated when the limiting elements and the attributes are defined as fulcrums on the cause-effect network, and a cause-effect network, whose correlation coefficient is large, is extracted. Therefore, it becomes possible to grasp the phenomenon process in which the complicated phenomenon is gradually changed into simple hierarchy levels together with the change of the cause-effect networks.

(16) An error variance indicative of a magnitude of a variance area of the cause-effect network is calculated, and the common concept is extracted in a hierarchy level in which the correlation coefficient is large and the error variance is small. Therefore, it becomes possible to set a numeral indicator at a path between the limiting elements and to easily produce the cause-effect networks even if all of the limiting elements are compared.

Other Embodiments

Figure 23:
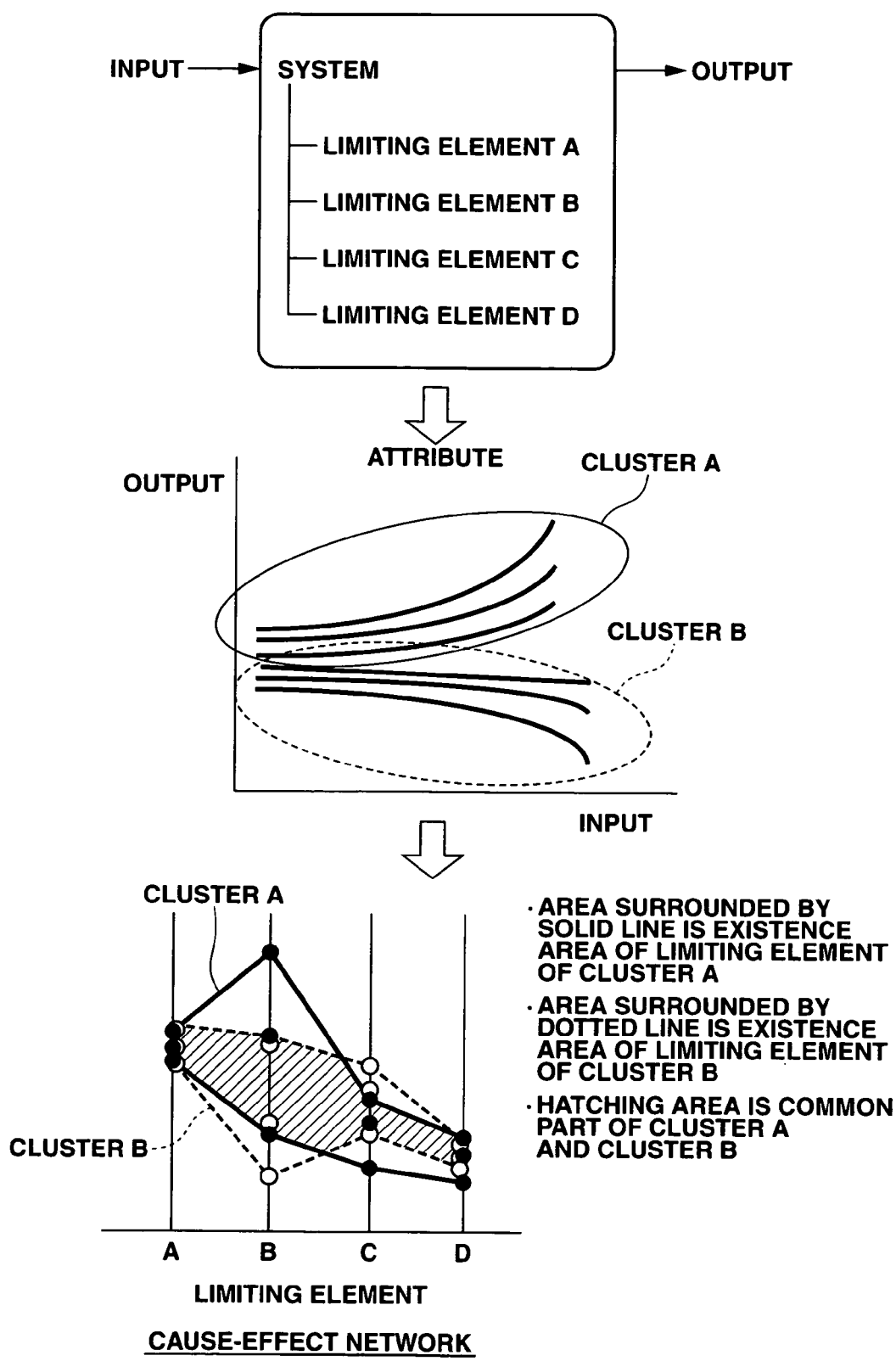
FIG. 23 is graphs showing the cause-effect networks of the liming elements in other embodiment.

Subsequently, there is discussed other embodiments. Although the above-discussed embodiment has been shown and described such that the limiting elements are placed on a polygonal shape or circle to indicate the cause-effect networks, they may be indicated on property axes arranged in parallel. FIG. 23 is a schematic view showing another embodiment of the present invention. Assuming that limiting elements A, B, C and D exist with respect to a system, attributes indicative of a relationship between an input and an output of the system are classified into cluster A and cluster B. Subsequently, a property axis is arranged in parallel to a two-dimensional plane, and a limiting element existing areas (variance) of the respective clusters A and B are overlapped and indicated on the axis. In FIG. 23, an area surrounded by a solid line is the A-area in which the limiting elements of the cluster A exist, and the area surrounded by a dotted line is the B-area in which the limiting elements of the cluster B exist. It may be arranged such that a hatching area, where the A-area and B-area are overlapped, represents a cause-effect network where correlation is large.

Although the first embodiment has been concretely described, it is effective in view of industry that the information processing technique based on the theoretical structure of the first embodiment are prepared as a program recorded medium which is capable of being used in a computer. Such a program recording medium may be CD (compact disc) and DVD (digital versatile disc) and may be stored in a computer server in the form of program and properly downloaded. Further, the program recording medium may be a device including a flash memory or a read-only memory (ROM).

This application is based on Japanese Patent Application No. 2005-177360 filed on Jun. 17, 2005 in Japan. The entire contents of this Japanese Patent Application are incorporated herein by reference.

Although the invention has been described above by reference to certain embodiments of the invention, the invention is not limited to the embodiments described above. Modifications and variations of the embodiments described above will occur to those skilled in the art, in light of the above teaching. The scope of the invention is defined with reference to the following claims.

What is claimed is:

1. An information processing apparatus comprising:
   a computer-readable recording medium, comprising:
   a classifying section classifying a set of attributes, which represent relationships between an input and an output of a system defined by a plurality of limiting elements, into classification levels on the basis of a tendency of the attributes by using a hierarchical clustering technique for clustering the set into hierarchy levels on the basis of the tendency;
   a limiting element indicating section indicating a limiting element corresponding to a classified attribute; and
   a comparing section comparing the indicated limiting element in a classified level with the indicated limiting element in other classified levels,
   wherein the comparing section extracts a common concept on the basis of the limiting element common among the hierarchy levels,
   wherein the limiting element indicating section constructs a cause-effect network indicative of a relationship between the limiting element and an attribute by placing the plurality of limiting elements and the attributes in a same dimension, and
   wherein the computer-readable recording medium further comprises a correlation coefficient calculating section which calculates a correlation coefficient indicative of a magnitude of the relationship between fulcrums when the limiting elements and the attributes are defined as fulcrums on the cause-effect network, the comparing section extracting a cause-effect network whose correlation coefficient is larger than a pre-defined value by calculating correlation coefficients between all fulcrums at the correlation coefficient calculating section.

2. The information processing apparatus as claimed in claim 1, wherein the comparing section extracts a common concept on the basis of a limiting element common in the classified levels.

3. The information processing apparatus as claimed in claim 2, wherein the comparing section extracts a factor term by comparing one of a special attribute and the limiting element in a special classified level with the common concept.

4. The information processing apparatus as claimed in claim 1, wherein the comparing section extracts a common concept on the basis of the limiting element common in a hierarchy level only.

5. The information processing apparatus as claimed in claim 1, wherein the computer-readable recording medium further comprises a sampling section which executes sampling of the set of the attributes representative of the relationship of the input and the output with respect to a system defined by the plurality of the limiting elements, the sampling section executing the sampling without generating a deviation in combinations of the limiting elements.

6. The information processing apparatus as claimed in claim 5, wherein the sampling section uses an orthogonal table.

7. The information processing apparatus as claimed in claim 1, wherein the classifying section classifies the attributes on the basis of a similarity in Euclidean distance.

8. The information processing apparatus as claimed in claim 7, wherein the classifying section classifies the attributes on the basis of a similarity in distance between a centroid of the classified level and each attribute.

9. The information processing apparatus as claimed in claim 1, wherein the limiting element indicating section places the plurality of limiting elements on a two-dimensional plane.

10. The information processing apparatus as claimed in claim 9, wherein the limiting element indicating section places each limiting element on a polygonal shape.

11. The information processing apparatus as claimed in claim 9, wherein the limiting element indicating section places each limiting element on a property axis arranged in parallel to a plane.

12. The information processing apparatus as claimed in claim 1, wherein the limiting element indicating section indicates all limiting elements.

13. The information processing apparatus as claimed in claim 1, further comprising an error variance calculating section which calculates a magnitude of a variance area of the cause-effect network, the comparing section extracting a common concept in a hierarchy level in which the correlation coefficient is larger than a pre-defined value and an error variance is smaller than a pre-defined value.

14. The information processing apparatus as claimed in claim 1, wherein two fulcrums are connected by a line which color becomes different according to the magnitude of the correlation coefficient.

15. The information processing apparatus as claimed in claim 1, wherein two fulcrums are connected by a line whose kind becomes different according to the magnitude of the correlation coefficient.

16. An information-processing-program recording medium comprising:
   a classification commanding section outputting a command to classify a set of attributes, which represent relationships between an input and an output of a system defined by a plurality of limiting elements, into classification levels on a basis of a tendency of the attributes;
   a limiting element indication commanding section outputting a command to indicate a limiting element corresponding to a classified attribute;
   a comparison commanding section outputting a command to compare the indicated limiting element in a classified level with the indicated limiting element in other classified levels,
   wherein the classification commanding section executes a hierarchical clustering technique for clustering the set into hierarchy levels on the basis of the tendency,
   wherein the comparison commanding section extracts a common concept on the basis of a limiting element common among the hierarchy levels,
   an error variance calculation commanding section which calculates a magnitude of a variance area of the cause-effect network, the comparison commanding section extracting a common concept in a hierarchy level in which the correlation coefficient is larger than a pre-defined value and an error variance is smaller than a pre-defined value, and
   a defining section which defines the limiting elements and the attributes as fulcrums on the cause-effect network and a correlation coefficient calculation commanding section which outputs a command to calculate a correlation coefficient indicative of a magnitude of the relationship between the fulcrums, and the comparison commanding section outputting a command to extract a cause-effect network whose correlation coefficient is larger than a pre-defined value by calculating correlation coefficients between all fulcrums at the correlation coefficient calculation commanding section.

17. The information-processing-program recording medium as claimed in claim 16, wherein the comparison commanding section comprises an extracting section which extracts a common concept on the basis of a limiting element common in the classified levels.

18. The information-processing-program recording medium as claimed in claim 17, wherein the comparison commanding section extracts a factor term by comparing one of a specified attribute and the limiting element in a special classified level with the common concept.

19. The information-processing-program recording medium as claimed in claim 16, wherein the comparison commanding section extracts a common concept on the basis of a limiting element common in a hierarchy level only.

20. The information-processing-program recording medium as claimed in claim 16, further comprising a sampling commanding section which executes sampling of the set of the attributes representative of the relationship of the input and the output with respect to a system defined by the plurality of the limiting elements, the sampling commanding section executing the sampling without generating a deviation in combinations of the limiting elements.

21. The information-processing-program recording medium as claimed in claim 20, wherein the sampling commanding section uses an orthogonal table.

22. The information-processing-program recording medium as claimed in claim 16, wherein the classification commanding section outputs a command to classify the attributes on the basis of a similarity in Euclidean distance.

23. The information-processing-program recording medium as claimed in claim 22, wherein the classification commanding section outputs a command to classify the attributes on the basis of a similarity in distance between a centroid of the classified level and each attribute.

24. The information-processing-program recording medium as claimed in claim 16, wherein the limiting element indication commanding section outputs a command to place the plurality of limiting elements on a two-dimensional plane.

25. The information-processing-program recording medium as claimed in claim 24, wherein the limiting element indication commanding section outputs a command to place each limiting element on a polygonal shape.

26. The information-processing-program recording medium as claimed in claim 24, wherein the limiting element indication commanding section outputs a command to place each limiting element on a property axis arranged in parallel to a plane.

27. The information-processing-program recording medium as claimed in claim 16, wherein the limiting element indication commanding section outputs a command to indicate all limiting elements.

28. The information-processing-program recording medium as claimed in claim 16, further comprising an error variance calculation commanding section which calculates a magnitude of a variance area of the cause-effect network, the comparison commanding section extracting a common concept in a hierarchy level in which the correlation coefficient is larger than a pre-defined value and an error variance is smaller than a pre-defined value.

29. The information-processing-program recording medium as claimed in claim 16, wherein two fulcrums are connected by a line which color becomes different according to the magnitude of the correlation coefficient.

30. The information-processing-program recording medium as claimed in claim 16, wherein two fulcrums are connected by a line whose kind becomes different according to the magnitude of the correlation coefficient.

31. The information-processing-program recording medium as claimed in claim 16, further comprising a linkage commanding section which simulates the system defined by the limiting elements and outputs a command to link simulation of the system.

32. A method of processing information comprising:
classifying by using a computer a set of attributes, which represent relationships between an input and an output of a system defined by a plurality of limiting elements, into classification levels on the basis of a tendency of the attributes by using a hierarchical clustering technique for clustering the set into hierarchy levels on the basis of the tendency;
indicating a limiting element corresponding to the classified attribute;
comparing the indicated limiting element in a classified level with the indicated limiting element in other classified levels;
extracting a common concept on the basis of the limiting element common among a hierarchy levels;
constructing a cause-effect network indicative of a relationship between the limiting element and an attribute by placing the plurality of limiting elements and the attributes in the same dimension,
calculating a correlation coefficient indicative of a magnitude of the relationship between fulcrums when the limiting elements and the attributes are defined as fulcrums on the cause-effect network; and
extracting a cause-effect network whose correlation coefficient is larger than a pre-defined value by calculating correlation coefficients between all fulcrums.

33. The method as claimed in claim 32, further comprising, extracting a factor term by comparing one of a special attribute and the limiting element in a special classified level with the common concept.

* * * * *